(12) United States Patent
Ishikawa et al.

(10) Patent No.: US 8,715,138 B2
(45) Date of Patent: May 6, 2014

(54) HYDRAULIC CONTROL DEVICE

(75) Inventors: Tomomi Ishikawa, Anjo (JP); Koji Makino, Okazaki (JP); Kenichi Tsuchida, Nishio (JP); Naoyuki Fukaya, Okazaki (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/985,205

(22) PCT Filed: Mar. 1, 2012

(86) PCT No.: PCT/JP2012/055163
§ 371 (c)(1),
(2), (4) Date: Aug. 13, 2013

(87) PCT Pub. No.: WO2012/132746
PCT Pub. Date: Oct. 4, 2012

(65) Prior Publication Data
US 2013/0319555 A1 Dec. 5, 2013

(30) Foreign Application Priority Data
Mar. 30, 2011 (JP) .................................. 2011-074003

(51) Int. Cl.
*F16H 61/00* (2006.01)
(52) U.S. Cl.
USPC .......................................................... 477/168
(58) Field of Classification Search
USPC .......... 475/128, 127, 130; 477/127, 130, 131, 477/168, 70
See application file for complete search history.

(56) References Cited

U.S. PATENT DOCUMENTS 6,729,988 B2    5/2004 Katou et al.
7,464,618 B2 *  12/2008 Mohlmann et al. ............. 74/346

(Continued)

FOREIGN PATENT DOCUMENTS

| JP | A-9-303547   | 11/1997 |
| JP | A-2000-46163 | 2/2000  |
| JP | A-2003-294118| 10/2003 |
| JP | A-2004-36671 | 2/2004  |

OTHER PUBLICATIONS

May 1, 2012 International Search Report issued in International Patent Application No. PCT/JP2012/055163.

*Primary Examiner* — David D. Le
*Assistant Examiner* — David J Hlavka
(74) *Attorney, Agent, or Firm* — Oliff PLC

(57) ABSTRACT

In a hydraulic control device, when a solenoid pressure from a linear solenoid valve is not supplied to a brake, which is normally not engaged at the same time as a brake, not to engage the brake, a switching valve is supplied with a line pressure as a signal pressure for establishing a blocked/discharge state in which supply of the solenoid pressure to the brake is blocked and a hydraulic pressure can be discharged from the brake. When the solenoid pressure is supplied to the brake to engage the brake, the switching valve is supplied with a modulator pressure, which is lower than the line pressure, as a signal pressure for establishing a communicated state in which the solenoid pressure can be supplied to the brake.

14 Claims, 5 Drawing Sheets

(56) References Cited

U.S. PATENT DOCUMENTS

| | | | |
|---|---|---|---|
| 7,993,231 B2 * | 8/2011 | Shimizu et al. | 475/127 |
| 8,066,090 B2 * | 11/2011 | Shimizu et al. | 180/305 |
| 8,182,397 B2 * | 5/2012 | Shimizu et al. | 477/127 |
| 8,210,990 B2 * | 7/2012 | Yoshioka et al. | 477/130 |
| 8,262,527 B2 * | 9/2012 | Shimizu et al. | 475/134 |
| 8,303,468 B2 * | 11/2012 | Shimizu et al. | 477/130 |
| 8,430,794 B2 * | 4/2013 | Shimizu et al. | 477/130 |
| 8,435,159 B2 * | 5/2013 | Shimizu et al. | 477/130 |
| 8,517,877 B2 * | 8/2013 | Ishikawa et al. | 475/127 |
| 8,522,946 B2 * | 9/2013 | Shimizu et al. | 192/85.63 |

* cited by examiner

|  |  | C-1 | C-2 | C-3 | B-1 | B-3 | F-2 |
|---|---|---|---|---|---|---|---|
|  | P |  |  |  |  |  |  |
|  | REV |  |  | ○ |  | ○ |  |
|  | N |  |  |  |  |  |  |
| D | 1st | ○ |  |  |  | ● | ○ |
|  | 2nd | ○ |  |  | ○ |  |  |
|  | 3rd | ○ | ○ |  |  |  |  |
|  | 4th |  | ○ |  | ○ |  |  |

※ ○: ENGAGED, ●: ENGAGED WITH ENGINE BRAKE IN OPERATION

HYDRAULIC CONTROL DEVICE

INCORPORATION BY REFERENCE

The disclosure of Japanese Patent Application No. 2011-074003 filed on Mar. 30, 2011 including the specification, drawings and abstract is incorporated herein by reference in its entirety.

BACKGROUND OF THE INVENTION

The present invention relates to a hydraulic control device for a speed change device capable of transferring power applied to an input member to an output member at a speed change ratio that is changeable in a plurality of stages by engaging and disengaging a plurality of hydraulic friction engagement elements.

DESCRIPTION OF THE RELATED ART

Hitherto, there has been known a hydraulic control device including a failure-time switching valve that is switched to a failure-time position when hydraulic pressures to be supplied to a plurality of friction engagement elements that are normally not engaged at the same time as each other are input at the same time, a solenoid valve that outputs a signal pressure in a predetermined state, and a switching valve provided in an oil passage that supplies a hydraulic pressure to one of the plurality of friction engagement elements to allow communication through the oil passage on the basis of the signal pressure from the solenoid valve (see Japanese Patent Application Publication No. 2004-36671 (JP 2004-36671 A), for example). The failure-time switching valve of the hydraulic control device includes an input port that receives the signal pressure from the solenoid valve, and an output port that communicates with the input port when the failure-time switching valve is switched to the failure-time position, and outputs a failure-time signal pressure based on the signal pressure from the solenoid valve via the output port when the failure-time switching valve is switched to the failure-time position in the predetermined state. In addition, the switching valve blocks the oil passage on the basis of the failure-time signal pressure from the failure-time switching valve. This allows the one of the friction engagement elements to be disengaged with the failure-time switching valve outputting the failure-time signal pressure even if a failure in which the plurality of friction engagement elements are engaged at the same time as each other occurs, for example, when the one of the friction engagement elements is engaged on the basis of the signal pressure from the solenoid valve, that is, when the plurality of friction engagement elements may be engaged at the same time as each other. This also prevents output of the failure-time signal pressure when the one of the friction engagement elements is not engaged in response to the signal pressure from the solenoid valve and the other two friction engagement elements are not engaged.

SUMMARY OF THE INVENTION

When the failure-time switching valve outputs the failure-time signal pressure to the switching valve while the hydraulic pressures to be supplied to the plurality of friction engagement elements that are normally not engaged at the same time as each other are input to the failure-time switching valve at the same time as each other, however, a delay may be caused in the supply of the failure-time signal pressure from the failure-time switching valve to the switching valve, depending on the configuration of the oil passage etc.

Thus, it is a main object of the hydraulic control device according to the present invention to more adequately suppress simultaneous engagement of a plurality of hydraulic friction engagement elements that are normally not engaged at the same time as each other.

In order to achieve the foregoing main object, the hydraulic control device according to the present invention adopts the following means.

An aspect of the present invention provides a hydraulic control device for a speed change device capable of transferring power applied to an input member to an output member at a speed change ratio that is changeable in a plurality of stages by engaging and disengaging a plurality of hydraulic friction engagement elements, the hydraulic control device including:

a first pressure regulation valve that regulates a hydraulic pressure to be supplied to a first hydraulic friction engagement element;

a second pressure regulation valve that regulates a hydraulic pressure to be supplied to a second hydraulic friction engagement element that is normally not engaged at the same time as the first hydraulic friction engagement element; and a switching valve that can establish a blocked/discharge state, in which supply of the hydraulic pressure from the second pressure regulation valve to the second hydraulic friction engagement element is blocked and a hydraulic pressure can be discharged from the second hydraulic friction engagement element, and a communicated state, in which the hydraulic pressure from the second pressure regulation valve can be supplied to the second hydraulic friction engagement element, and that can receive a signal pressure for establishing the blocked/discharge state and the communicated state and the hydraulic pressure from the first pressure regulation valve, wherein the switching valve is supplied with a first signal pressure as the signal pressure when the blocked/discharge state is established and supplied with a second signal pressure, which is lower than the first signal pressure, as the signal pressure when the communicated state is established, and the switching valve establishes the blocked/discharge state when the hydraulic pressure from the first pressure regulation valve is input in the communicated state.

In the hydraulic control device, when the hydraulic pressure from the second pressure regulation valve is not supplied to the second hydraulic friction engagement element, which is normally not engaged at the same time as the first hydraulic friction engagement element, so as not to engage the second hydraulic friction engagement element, the switching valve is supplied with the first signal pressure as a signal pressure for establishing the blocked/discharge state. When the hydraulic pressure from the second pressure regulation valve is supplied to the second hydraulic friction engagement element to engage the second hydraulic friction engagement element, on the contrary, the switching valve is supplied with the second signal pressure, which is lower than the first signal pressure, as a signal pressure for establishing the communicated state. Consequently, even if the hydraulic pressure from the first pressure regulation valve is supplied to the switching valve when the first hydraulic friction engagement element is to be engaged with the second hydraulic friction engagement element not engaged, the switching valve can be more reliably maintained in the blocked/discharge state by the first signal pressure, which is higher than the second signal pressure. Thus, according to the hydraulic control device, it is possible to suppress variations in hydraulic pressure to be supplied to the first hydraulic friction engagement element due to supply of the hydraulic pressure from the first pressure regulation valve to the switching valve when the first hydraulic friction engagement element is to be engaged with the second hydraulic friction engagement element not engaged. In addition, supplying the second signal pressure, which is lower than the first signal pressure, to the switching valve as a signal pressure for establishing the communicated state when the second hydraulic friction engagement element is engaged facilitates establishing the blocked/discharge state using the hydraulic pressure from the first pressure regulation valve when the hydraulic pressure from the first pressure regulation valve is supplied to the switching valve with the second hydraulic friction engagement element engaged. Consequently, even if the hydraulic pressure from the first pressure regulation valve were supplied to the switching valve when the second hydraulic friction engagement element is engaged, the switching valve could be quickly switched from the communicated state into the blocked/discharge state using the hydraulic pressure from the first pressure regulation valve, thereby favorably suppressing simultaneous engagement of the first and second hydraulic friction engagement elements with the second hydraulic friction engagement element engaged. As a result, with the hydraulic control device, it is possible to more adequately suppress simultaneous engagement of the first and second hydraulic friction engagement elements which are normally not engaged at the same time as each other.

In addition, the hydraulic control device may further include a second switching valve that can establish a first state, in which the hydraulic pressure from the second pressure regulation valve can be supplied to a third hydraulic friction engagement element that is not engaged at the same time as the second hydraulic friction engagement element, and a second state, in which the hydraulic pressure from the second pressure regulation valve can be supplied to the second hydraulic friction engagement element and a hydraulic pressure can be discharged from the third hydraulic friction engagement element, and the second switching valve may receive the first signal pressure and the second signal pressure, and may supply the first signal pressure to the switching valve as the signal pressure when the first state is established and supply the second signal pressure to the switching valve as the signal pressure when the second state is established. Use of the thus configured second switching valve makes it possible to selectively supply the hydraulic pressure from the second pressure regulation valve to the second and third hydraulic friction engagement elements which are not engaged at the same time as each other, and to switch the signal pressure for the switching valve between the first signal pressure and the second signal pressure in accordance with the state of supply of the hydraulic pressure to the second hydraulic friction engagement element.

Further, the first signal pressure may be a line pressure, and the second signal pressure may be a hydraulic pressure obtained by reducing the line pressure. Consequently, even if the hydraulic pressure from the first pressure regulation valve is supplied to the switching valve when the first hydraulic friction engagement element is to be engaged with the second hydraulic friction engagement element not engaged, the switching valve can be more reliably maintained in the blocked/discharge state by the first signal pressure, which is higher than the second signal pressure. In addition, when the hydraulic pressure from the first pressure regulation valve is supplied to the switching valve with the second hydraulic friction engagement element engaged, the blocked/discharge state can be more reliably established by the hydraulic pressure from the first pressure regulation valve.

Moreover, the switching valve may include a plunger disposed so as to be axially movable, a spool disposed coaxially with the plunger so as to be movable and capable of establishing the blocked/discharge state and the communicated state, and a spring that urges the spool against the plunger; and the spool may include a first pressure receiving surface that receives the hydraulic pressure from the first pressure regulation valve and a second pressure receiving surface formed on the opposite side from the first pressure receiving surface to receive an urging force of the spring, and the plunger may include a pressure receiving surface that faces the first pressure receiving surface of the spool to receive the hydraulic pressure from the first pressure regulation valve and a signal pressure receiving surface formed on the opposite side from the pressure receiving surface to receive the signal pressure.

In the case where the thus configured switching valve is used, the blocked/discharge state is established with the thrust applied to the plunger by the effect of the signal pressure on the signal pressure receiving surface exceeding the urging force of the spring applied to the spool, and the communicated state is established with the urging force of the spring applied to the spool exceeding the thrust applied to the plunger by the effect of the signal pressure on the signal pressure receiving surface. Meanwhile, when the hydraulic pressure from the first pressure regulation valve is supplied to the switching valve with the switching valve establishing the communicated state and with the second hydraulic friction engagement element engaged, the blocked/discharge state is established with the thrust applied to the spool by the effect of the hydraulic pressure from the first pressure regulation valve on the first pressure receiving surface exceeding the urging force of the spring applied to the spool. Thus, with the switching valve, using the second signal pressure, which is lower than the first signal pressure, as a signal pressure for establishing the communicated state makes it possible to reduce the urging force (rigidity) of the spring required to establish the communicated state. This makes it easier for the thrust applied to the plunger by the effect of the first signal pressure on the signal pressure receiving surface to exceed the urging force of the spring applied to the spool when the switching valve is brought into the blocked/discharge state, thereby more reliably maintaining the blocked/discharge state when the second hydraulic friction engagement element is not engaged. Further, using the second signal pressure, which is lower than the first signal pressure, as a signal pressure for bringing the switching valve into the communicated state to reduce the urging force (rigidity) of the spring makes it easier for the thrust applied to the spool by the effect of the hydraulic pressure from the first pressure regulation valve on the first pressure receiving surface to exceed the urging force of the spring applied to the spool when the hydraulic pressure from the first pressure regulation valve is supplied to the switching valve with the second hydraulic friction engagement element engaged. As a result, with use of the thus configured switching valve, even if the hydraulic pressure from the first pressure regulation valve were supplied to the switching valve when the second hydraulic friction engagement element is engaged, the switching valve could be quickly switched from the communicated state into the blocked/discharge state using the hydraulic pressure from the first pressure regulation valve. With such a configuration, in addition, when the hydraulic pressure from the first pressure regulation valve is supplied to the switching valve 70 as the first hydraulic friction engagement element is engaged with the second hydraulic friction engagement element not engaged, that is, with the first signal pressure, which is higher than the second signal pressure, supplied to the switching valve as a signal pressure, movement of the plunger can be restricted by the first signal pressure acting on the signal pressure receiving surface to more reliably suppress variations in volume of the oil chamber defined by the first pressure receiving surface of the spool and the pressure receiving surface of the plunger facing the first pressure receiving surface. Thus, according to such a configuration, it is possible to stably supply the hydraulic pressure from the first pressure regulation valve to the first hydraulic friction engagement element when the first hydraulic friction engagement element is to be engaged with the second hydraulic friction engagement element not engaged, thereby suppressing occurrence of a shock during engagement of the first hydraulic friction engagement element.

Furthermore, the switching valve may be supplied with a hydraulic pressure from an additional pressure regulation valve that is different from the first and second pressure regulation valves so that the hydraulic pressure from the additional pressure regulation valve acts on the second pressure receiving surface of the spool when the communicated state is established, and the switching valve may not be supplied with the hydraulic pressure from the additional pressure regulation valve when the blocked/discharge state is established. Consequently, the communicated state is established with the sum of the urging force of the spring applied to the spool and the thrust applied to the spool by the effect of the hydraulic pressure from the additional pressure regulation valve on the second pressure receiving surface exceeding the thrust applied to the plunger by the effect of the second signal pressure on the signal pressure receiving surface. Thus, it is possible to reduce the urging force (rigidity) of the spring required to bring the switching valve into the communicated state in order to supply the hydraulic pressure from the second pressure regulation valve to the second hydraulic friction engagement element. This makes it easier for the thrust applied to the plunger by the effect of the first signal pressure on the signal pressure receiving surface to exceed the urging force of the spring applied to the spool when the blocked/discharge state in which the hydraulic pressure from the additional pressure regulation valve is not supplied to the switching valve is established, thereby more reliably maintaining the blocked/discharge state when the second hydraulic friction engagement element is not engaged.

In addition, the hydraulic control device may further include a lock-up solenoid valve that generates a lock-up control pressure used to set a lock-up pressure to be supplied to a lock-up clutch, and the additional pressure regulation valve may be the lock-up solenoid valve.

The hydraulic control device may further include: a signal pressure output valve that can output a signal pressure for switching the second switching valve from the first state into the second state; and a lock-up relay valve that can establish a lock-up pressure supply state in which the lock-up pressure can be supplied to the lock-up clutch and a lock-up pressure block state in which supply of the lock-up pressure to the lock-up clutch is blocked, and the lock-up relay valve may be configured to receive the signal pressure from the signal pressure output valve, and to establish the lock-up pressure block state when the signal pressure from the signal pressure output valve is input.

Another aspect of the present invention provides
a hydraulic control device for a speed change device capable of transferring power applied to an input member to an output member at a speed change ratio that is changeable in a plurality of stages by engaging and disengaging a plurality of hydraulic friction engagement elements, the hydraulic control device including:

a first pressure regulation valve that regulates a hydraulic pressure to be supplied to a first hydraulic friction engagement element;
a second pressure regulation valve that regulates a hydraulic pressure to be supplied to a second hydraulic friction engagement element that is normally not engaged at the same time as the first hydraulic friction engagement element; and
a switching valve that can establish a blocked/discharge state, in which supply of the hydraulic pressure from the second pressure regulation valve to the second hydraulic friction engagement element is blocked and a hydraulic pressure can be discharged from the second hydraulic friction engagement element, and a communicated state, in which the hydraulic pressure from the second pressure regulation valve can be supplied to the second hydraulic friction engagement element, and that can receive a holding pressure for holding the communicated state and the hydraulic pressure from the first pressure regulation valve, wherein
the switching valve is supplied with the holding pressure and not supplied with the hydraulic pressure from the second hydraulic friction engagement element when the second hydraulic friction engagement element is not engaged, the switching valve is supplied with the hydraulic pressure from the second hydraulic friction engagement element and not supplied with the holding pressure when the second hydraulic friction engagement element is engaged, and the switching valve can establish the communicated state irrespective of presence or absence of the holding pressure and establishes the blocked/discharge state when the hydraulic pressure from the first pressure regulation valve is input with the holding pressure not supplied.

In the hydraulic control device, when the hydraulic pressure from the second pressure regulation valve is not supplied to the second hydraulic friction engagement element, which is normally not engaged at the same time as the first hydraulic friction engagement element, so as not to engage the second hydraulic friction engagement element, the switching valve is not supplied with the hydraulic pressure from the second pressure regulation valve, but supplied with the holding pressure for holding the communicated state. When the hydraulic pressure from the second pressure regulation valve is supplied to the second hydraulic friction engagement element to engage the second hydraulic friction engagement element, on the contrary, the switching valve establishes the communicated state without being supplied with the holding pressure, and supplies the hydraulic pressure from the second pressure regulation valve to the second hydraulic friction engagement element. Consequently, even if the hydraulic pressure from the first pressure regulation valve is supplied to the switching valve when the first hydraulic friction engagement element is to be engaged with the second hydraulic friction engagement element not engaged, the switching valve can be more reliably maintained in the communicated state by the holding pressure. Thus, according to the hydraulic control device, it is possible to suppress variations in hydraulic pressure to be supplied to the first hydraulic friction engagement element due to supply of the hydraulic pressure from the first pressure regulation valve to the switching valve when the first hydraulic friction engagement element is to be engaged with the second hydraulic friction engagement element not engaged. In addition, not supplying the holding pressure to the switching valve when the second hydraulic friction engagement element is engaged facilitates establishing the blocked/discharge state using the hydraulic pressure from the first pressure regulation valve when the hydraulic pressure from the first pressure regulation valve is supplied to the switching valve with the second hydraulic friction engagement element engaged. Consequently, even if the hydraulic pressure from the first pressure regulation valve were supplied to the switching valve when the second hydraulic friction engagement element is engaged, the switching valve could be quickly switched from the communicated state into the blocked/discharge state using the hydraulic pressure from the first pressure regulation valve, thereby favorably suppressing simultaneous engagement of the first and second hydraulic friction engagement elements with the second hydraulic friction engagement element engaged. As a result, with the hydraulic control device, it is possible to more adequately suppress simultaneous engagement of the first and second friction engagement elements which are normally not engaged at the same time as each other.

In addition, the switching valve may include a spool disposed so as to be movable and capable of establishing the blocked/discharge state and the communicated state, and a spring that urges the spool; and the spool may include a first pressure receiving surface that receives the hydraulic pressure from the first pressure regulation valve and a second pressure receiving surface formed on the opposite side from the first pressure receiving surface to receive the holding pressure and an urging force of the spring.

With the switching valve, when the spool is urged by the urging force of the spring to establish the communicated state and the holding pressure is supplied to the switching valve, not only the urging force of the spring but also the thrust due to the effect of the holding pressure on the second pressure receiving surface is applied to the spool, and thus the switching valve can be more reliably maintained in the blocked/discharge state. Meanwhile, when the hydraulic pressure from the first pressure regulation valve is supplied to the switching valve with the second hydraulic friction engagement element engaged, the blocked/discharge state is established with the thrust applied to the spool by the effect of the hydraulic pressure from the first pressure regulation valve on the first pressure receiving surface exceeding the urging force of the spring. The thus configured switching valve has a relatively simple configuration, and thus adopting the switching valve can reduce the cost of the hydraulic control device.

The hydraulic control device may further include a second switching valve that can establish a first state, in which the hydraulic pressure from the second pressure regulation valve can be supplied to a third hydraulic friction engagement element that is not engaged at the same time as the second hydraulic friction engagement element, and a second state, in which the hydraulic pressure from the second pressure regulation valve can be supplied to the second hydraulic friction engagement element and a hydraulic pressure can be discharged from the third hydraulic friction engagement element, and that can receive the holding pressure, and the second switching valve may supply the holding pressure to the switching valve when the first state is established, and blocks supply of the holding pressure to the switching valve and can discharge a hydraulic pressure from a spring chamber in which the spring of the switching valve is disposed when the second state is established. Use of the thus configured second switching valve makes it possible to selectively supply the hydraulic pressure from the second pressure regulation valve to the second and third hydraulic friction engagement elements which are not engaged at the same time as each other, and to switch whether the holding pressure is supplied to or discharged from the switching valve in accordance with the state of supply of the hydraulic pressure to the second hydraulic friction engagement element.

DETAILED DESCRIPTION OF THE EMBODIMENTS

Now, an embodiment of the present invention will be described below.

Figure 1:
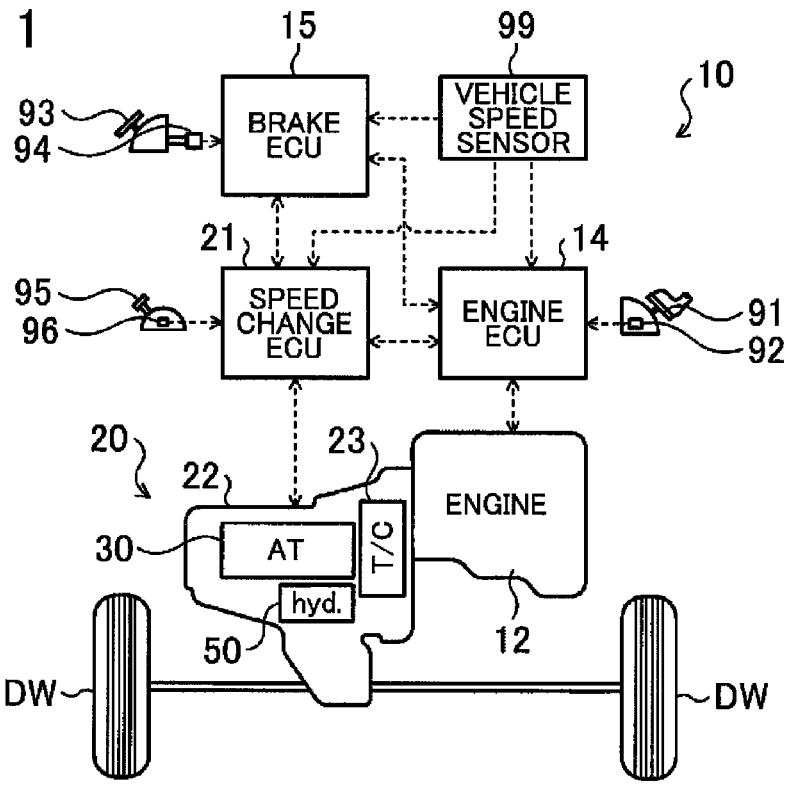
FIG. 1 shows a schematic configuration of an automobile 10 which is a vehicle incorporating a power transfer device 20 including a hydraulic control device 50 according to an embodiment of the present invention.
Figure 2:
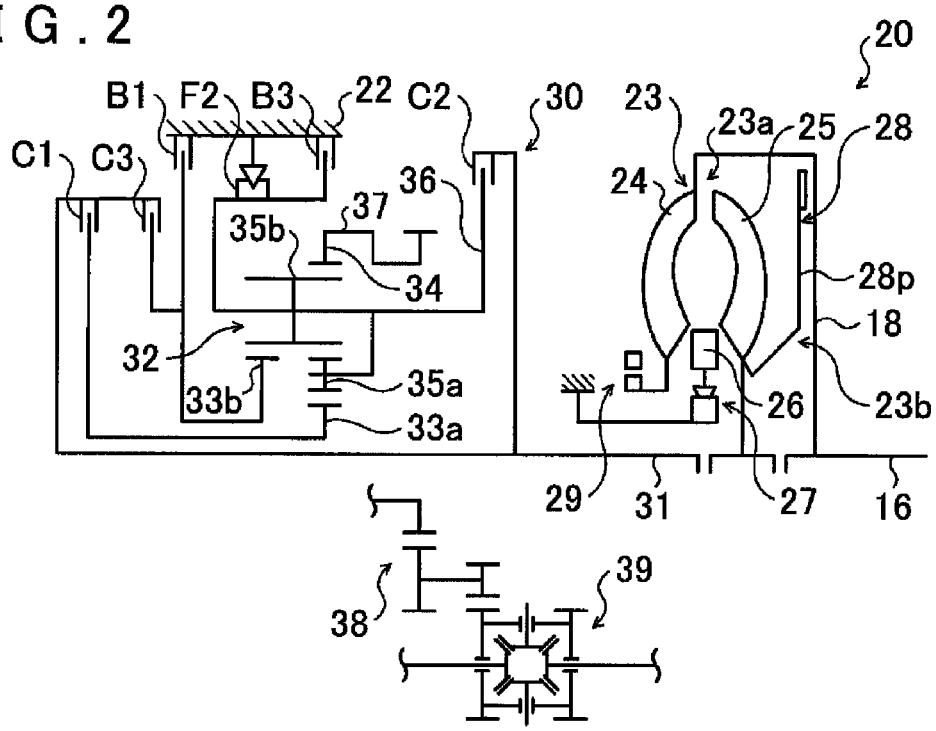
FIG. 2 shows a schematic configuration of the power transfer device 20.

FIG. 1 shows a schematic configuration of an automobile 10 which is a vehicle incorporating a power transfer device 20 including a hydraulic control device 50 according to an embodiment of the present invention. FIG. 2 shows a schematic configuration of the power transfer device 20. The automobile 10 shown in FIG. 1 includes an engine 12 serving as a power generation source which is an internal combustion engine that outputs power through explosive combustion of a mixture of a hydrocarbon fuel, such as gasoline and light oil, and air, an engine electronic control unit (hereinafter referred to as an "engine ECU") 14 that controls the engine 12, a brake electronic control unit (hereinafter referred to as a "brake ECU") 15 that controls an electronically controlled hydraulic brake unit (not shown), and the power transfer device 20 which includes a fluid transmission apparatus (starting device) 23, a stepped automatic transmission 30, the hydraulic control device 50 which supplies and discharges hydraulic oil (a hydraulic fluid) to and from the fluid transmission apparatus 23 and the automatic transmission 30, a speed change electronic control unit (hereinafter referred to as a "speed change ECU") 21 that controls the fluid transmission apparatus 23, the automatic transmission 30, and the hydraulic unit 50, and so forth. The power transfer device 20 is connected to a crankshaft 16 of the engine 12 to transfer power from the engine 12 serving as a power generation source to left and right drive wheels DW.

As shown in FIG. 1, the engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 99, signals from various sensors such as a crankshaft position sensor (not shown) that detects rotation of the crankshaft 16, and signals from the brake ECU 15 and the speed change ECU 21. The engine ECU 14 controls an electronically controlled throttle valve, a fuel injection valve, an ignition plug, and so forth (none of which is shown) on the basis of the received signals. In addition, the engine electronic control unit 14 according to the embodiment is configured to execute automatic start/stop control (idle stop control) in which operation of the engine 12 is stopped normally when the engine 12 is brought into idle operation as the automobile 10 becomes stationary and in which the engine 12 is restarted in response to a request to start the automobile 10 made by depressing the accelerator pedal 91.

The brake ECU 15 receives inputs such as a master cylinder pressure detected by a master cylinder pressure sensor 94 when a brake pedal 93 is depressed, the vehicle speed V from the vehicle speed sensor 99, signals from various sensors (not shown), and signals from the engine ECU 14 and the speed change ECU 21. The brake ECU 15 controls a brake actuator (hydraulic actuator) (not shown) on the basis of the received signals. The speed change ECU 21 of the power transfer device 20 is housed inside a transmission case 22. The speed change ECU 21 receives inputs such as a shift range SR from a shift range sensor 96 that detects the operation position of a shift lever 95 used to select a desired shift range from a plurality of shift ranges (in the embodiment, a parking range, a reverse range, a neutral range, a drive range, a 2nd-speed range, and an L range), the vehicle speed V from the vehicle speed sensor 99, signals from various sensors (not shown), and signals from the engine ECU 14 and the speed change ECU 15. The speed change ECU 21 controls the fluid transmission apparatus 23, the automatic transmission 30, and so forth on the basis of the received signals.

Each of the engine ECU 14, the brake ECU 15, and the speed change ECU 21 discussed above is formed as a microcomputer including a CPU (not shown) as a main component, and includes a ROM that stores various programs, a RAM that temporarily stores data, input and output ports and a communication port (not shown), and so forth besides the CPU. Moreover, the engine ECU 14, the brake ECU 15, and the speed change ECU 21 are connected to each other via a bus line or the like so that data required for control are exchanged between the ECUs as required.

The power transfer device 20 includes the fluid transmission apparatus 23 housed inside the transmission case 22, an oil pump (mechanical pump) 29 serving as a hydraulic pressure generation source, the automatic transmission 30, and so forth. The fluid transmission device 23 is formed as a fluidic torque converter with a lock-up clutch. As shown in FIG. 2, the fluid transmission device 23 includes a pump impeller 24 connected to the crankshaft 16 of the engine 12 via a front cover 18, a turbine runner 25 fixed to an input shaft (input member) 31 of the automatic transmission 30 via a turbine hub, a stator 26 disposed inside the pump impeller 24 and the turbine runner 25 to rectify the flow of hydraulic oil (ATF) from the turbine runner 25 to the pump impeller 24, a one-way clutch 27 that restricts rotation of the stator 26 to one direction, a lock-up clutch 28 having a damper mechanism (not shown), and so forth. The fluid transmission apparatus 23 functions as a torque amplifier through the action of the stator 26 when the difference in rotational speed between the pump impeller 24 and the turbine runner 25 is large, and functions as a fluid coupling when the difference in rotational speed between the pump impeller 24 and the turbine runner 25 is small. The lock-up clutch 28 can establish and release lock-up in which the front cover 18 and the input shaft 31 of the automatic transmission 30 are directly coupled to each other. If predetermined lock-up on conditions are met after the automobile 10 is started, the lock-up clutch 28 directly couples the front cover 18 and the input shaft 31 of the automatic transmission 30 to each other so that power from the engine 12 is mechanically and directly transferred to the input shaft 31. In this event, variations in torque to be transferred to the input shaft 31 are absorbed by the damper mechanism (not shown).

The lock-up clutch 28 according to the embodiment is configured to establish and release lock-up by varying the pressure in a lock-up chamber 23b that faces, via a lock-up piston 28p, a fluid transmission chamber 23a in which the pump impeller 24 and the turbine runner 25 of the fluid transmission apparatus 23 are disposed. That is, when the pressure in the lock-up chamber 23b is higher than the pressure in the fluid transmission chamber 23a, or when the pressure in the fluid transmission chamber 23a and the pressure in the lock-up chamber 23b are equal to each other, the lock-up piston 28p is not moved to the engagement side, and therefore, lock-up is not established (lock-up is released). When a pressure that is lower than the pressure in the fluid transmission chamber 23a is supplied to the inside of the lock-up chamber 23b to lower the pressure in the lock-up chamber 23b, on the contrary, the lock-up piston 28p is moved toward the front cover 18 to bring a friction member into pressure contact with an inner surface of the front cover 18, and thereby lock-up is established (completed).

The oil pump 29 serving as a hydraulic pressure generation source is found as a gear pump including a pump assembly including a pump body and a pump cover, and an externally toothed gear connected via a hub to the pump impeller 24 of the fluid transmission apparatus 23, and connected to the hydraulic control device 50. When the engine 12 is in operation, power from the engine 12 rotates the externally toothed gear, which causes the oil pump 29 to suck and discharge hydraulic oil reserved in an oil pan via a strainer (both not shown). Thus, during operation of the engine 12, the oil pump 29 can generate a hydraulic pressure required by the fluid transmission apparatus 23 or the automatic transmission 30, and supply hydraulic oil to portions to be lubricated such as various bearings.

The automatic transmission 30 is formed as a 4-speed transmission. As shown in FIG. 2, the automatic transmission 30 includes a Ravigneaux type planetary gear device 32 and a plurality of clutches C1, C2, and C3, two brakes B1 and B3, and a one-way clutch F2 that change a power transfer path from the input side to the output side. The Ravigneaux type planetary gear mechanism 32 includes two sun gears 33a and 33b which are each an externally toothed gear, a ring gear 34 which is an internally toothed gear fixed to an output shaft (output member) 37 of the automatic transmission 30, a plurality of short pinion gears 35a meshed with the sun gear 33a, a plurality of long pinion gears 35b meshed with the sun gear 33b and the plurality of short pinion gears 35a and meshed with the ring gear 34, and a carrier 36 that holds the plurality of short pinion gears 35a and the plurality of long pinion gears 35b, which are coupled to each other, so as to be rotatable about their respective axes and revolvable around a common axis and that is supported by the transmission case 22 via the one-way clutch F2. The output shaft 37 of the automatic transmission 30 is connected to the drive wheels DW via a gear mechanism 38 and a differential mechanism 39.

Figures 3, 4:
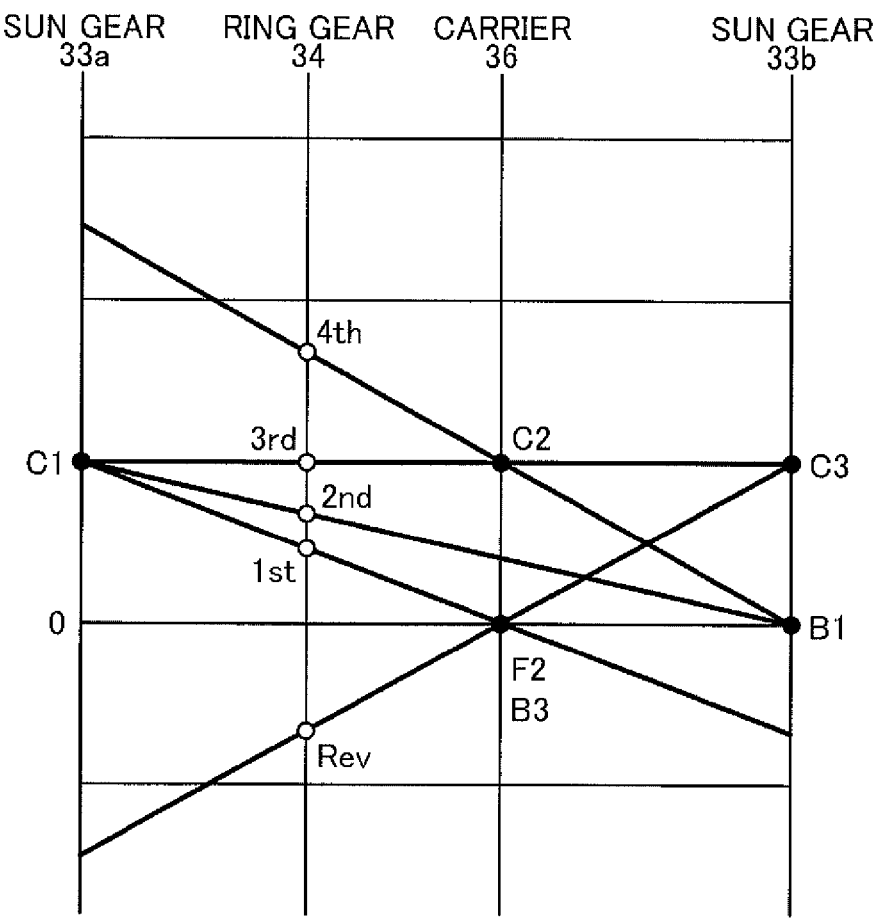
FIG. 3 is an operation table showing the relationship between each shift speed of an automatic transmission 30 included in the power transfer device 20 and the respective operating states of clutches and brakes.
FIG. 4 is a collinear diagram illustrating the relationship between the respective rotational speeds of rotary elements forming the automatic transmission 30.

The clutch C1 is a hydraulic clutch capable of engaging and disengaging the input shaft 31 and the sun gear 33a of the Ravigneaux type planetary gear device 32 with and from each other. The clutch C2 is a hydraulic clutch capable of engaging and disengaging the input shaft 31 and the carrier 36 of the Ravigneaux type planetary gear device 32 with and from each other. The clutch C3 is a hydraulic clutch capable of engaging and disengaging the input shaft 31 and the sun gear 33b of the Ravigneaux type planetary gear device 32 with and from each other. The brake B1 is a hydraulic clutch capable of fixing and unfixing the sun gear 33b of the Ravigneaux type planetary gear device 32 to and from the transmission case 22. The brake B3 is a hydraulic clutch capable of fixing and unfixing the carrier 36 of the Ravigneaux type planetary gear device 32 to and from the transmission case 22. The clutches C1 to C3 and the brakes B1 and B3 operate with hydraulic oil supplied thereto and discharged therefrom by the hydraulic control device 50, FIG. 3 is an operation table showing the relationship between each shift speed of the automatic transmission 30 and the respective operating states of the clutches C1 to C3, the brakes B1 and B3, and the one-way clutch F2. FIG. 4 is a collinear diagram illustrating the relationship between the respective rotational speeds of rotary elements forming the automatic transmission 30. The automatic transmission 30 provides first to fourth forward shift speeds and one reverse shift speed when the clutches C1 to C3 and the brakes B1 and B3 are brought into respective states shown in the operation table of FIG. 3.

Figure 5:
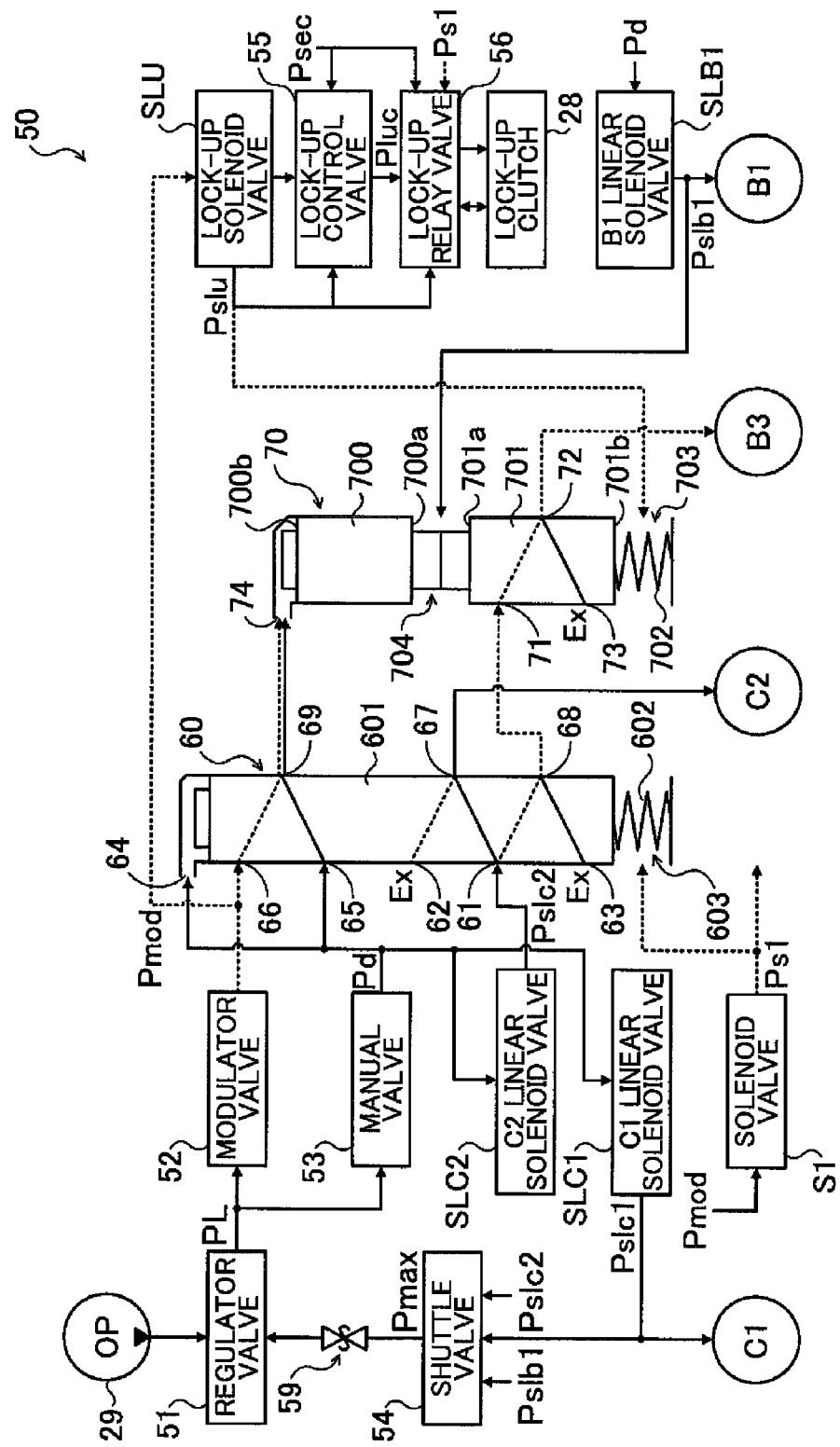
FIG. 5 is a system diagram showing the hydraulic control device 50.

FIG. 5 is a system diagram showing the hydraulic control device 50 which supplies and discharges hydraulic oil to and from the fluid transmission apparatus 23 including the lock-up clutch 28 discussed above and the automatic transmission 30. The hydraulic control device 50 is connected to the oil pump 29 discussed above which is driven by power from the engine 12 to suck and discharge hydraulic oil from the oil pan. As shown in FIG. 5, the hydraulic control device 50 includes a primary regulator valve 51 that regulates the hydraulic oil from the oil pump 29 to generate a line pressure PL, a modulator valve 52 that generates a constant modulator pressure Pmod, a manual valve 53 that switches the supply destination of the line pressure PL from the primary regulator valve 51 in accordance with the operating position of the shift lever 95, a C1 linear solenoid valve SLC1 that regulates the line pressure PL from the manual valve 53 (primary regulator valve 51) to generate a C1 solenoid pressure $Ps1c1$ for the clutch C1, a C2 linear solenoid valve SLC2 that regulates the line pressure PL from the manual valve 53 (primary regulator valve 51) to generate a C2 solenoid pressure $Ps1c2$ for the clutch C2, and a B1 linear solenoid valve SLB1 that regulates the line pressure PL from the manual valve 53 (primary regulator valve 51) to generate a B1 solenoid pressure $Ps1b1$ for the brake B1.

In addition, the hydraulic control device 50 according to the embodiment includes a shuttle valve (maximum pressure selection valve) 54 that is connected to respective output ports of the linear solenoid valves SLC1, SLC2, and SLB1 and that outputs a maximum pressure Pmax that is the highest of the C1 solenoid pressure $Ps1c1$, the C2 solenoid pressure $Ps1c2$, and the B1 solenoid pressure $Ps1b1$. Further, in order to actuate the lock-up clutch 28 of the fluid transmission apparatus 23, the hydraulic control device 50 includes a lock-up solenoid valve SLU that regulates the modulator pressure Pmod from the modulator valve 52 to generate a lock-up solenoid pressure (lock-up control pressure) Pslu, a lock-up control valve 55 that generates a lock-up pressure Plup to be supplied to the lock-up clutch 28 and corresponding to the lock-up solenoid pressure Pslu from the lock-up solenoid valve SLU, and a lock-up relay valve 56 capable of establishing a lock-up pressure supply state in which the lock-up pressure Plup can be supplied to the lock-up chamber 23b of the fluid transmission apparatus 23 and a lock-up pressure block state in which supply of the lock-up pressure Plup to the lock-up chamber 23b is blocked.

The primary regulator valve 51 receives as a signal pressure the maximum pressure Pmax from the shuttle valve 54 discussed above via a safety valve 59 to generate the line pressure PL corresponding to the maximum pressure Pmax. It should be noted, however, that the primary regulator valve 51 may be driven by a control pressure from a linear solenoid valve (not shown) that regulates the pressure of hydraulic oil from the oil pump 29 side (for example, the modulator valve 52) in accordance with the accelerator operation amount Acc or the operation amount of the throttle valve to output the control pressure. The modulator valve 52 according to the embodiment is a pressure regulation valve that regulates the line pressure PL from the primary regulator valve 51 using the urging force of a spring and a feedback pressure to generate the modulator pressure Pmod which is generally constant.

The manual valve 53 includes a spool that is axially slidable in conjunction with the shift lever 95, an input port to which the line pressure PL is supplied, a drive range output port that communicates with respective input ports of the C1 linear solenoid valve SLC1, the C2 linear solenoid valve SLC2, and the B1 linear solenoid valve SLB1 via an oil passage, a reverse range output port that communicates with a hydraulic pressure entrance of the clutch C3 via an oil passage, and so forth. When a driver selects one of the drive range, the 2nd-speed range, and the L range which are each a forward travel shift range, the spool of the manual valve 53 allows the input port to communicate with only the drive range output port so that the line pressure PL (drive range pressure Pd) is supplied to the C1 linear solenoid valve SLC1, the C2 linear solenoid valve SLC2, and the B1 linear solenoid valve SLB1. When the driver selects the reverse range for reverse travel, the spool of the manual valve 53 allows the input port to communicate with only the reverse range output port so that the line pressure PL (Pr) is supplied to the clutch C3. When the driver selects the parking range or the neutral range, the spool of the manual valve 53 blocks communication between the input port and the drive range output port and the reverse range output port.

The C1 linear solenoid valve SLC1 is a normally open linear solenoid valve that regulates the line pressure PL from the manual valve 53 in accordance with the value of a current applied from an auxiliary battery (not shown) to generate the C1 solenoid pressure $Ps1c1$ to be supplied to the clutch C1. The C2 linear solenoid valve SLC2 is a normally open linear solenoid valve that regulates the line pressure PL from the manual valve 53 in accordance with the value of a current applied from the auxiliary battery (not shown) to generate the C2 solenoid pressure $Ps1c2$ to be supplied to the clutch C2. The B1 linear solenoid valve SLB1 is a normally closed linear solenoid valve that regulates the line pressure PL from the manual valve 53 in accordance with the value of a current applied from the auxiliary battery (not shown) to generate the B1 solenoid pressure $Ps1b1$ to be supplied to the brake B1.

The linear solenoid valves SLC1, SLC2, and SLB1 (respective currents applied thereto) are each controlled by the speed change ECU 21. In the embodiment, from the viewpoint of the cost and the ease of design, the linear solenoid valves SLC1, SLC2, and SLB1 have the same size and the same maximum output pressure. In the automatic transmission 30 according to the embodiment, further, the torque distribution ratio of the brake B1 which is engaged to establish one of the second speed and the fourth speed is lower than the torque distribution ratio of the clutch C1 which is engaged together with the brake B1 to establish the second speed and the clutch C2 which is engaged together with the brake B1 to establish the fourth speed. Thus, during travel of the automobile 10, the output pressure required for the B1 linear solenoid valve SLB1 corresponding to the brake B1 is lower than the output pressure required for the C1 linear solenoid valve SLC1 corresponding to the clutch C1 and the C2 linear solenoid valve SLC2 corresponding to the clutch C2. Consequently, the maximum output pressure is not required for the B1 linear solenoid valve SLB1 during normal travel of the automobile 10, and the output pressure required for the B1 linear solenoid valve SLB1 falls within a range, the upper limit of which is defined by a normally used upper limit pressure which is sufficiently lower than the maximum output pressure.

In the embodiment, in addition, when friction torque is transferred from the turbine runner 25 side to the output shaft 37 with the first speed established in the automatic transmission 30 (with engine brake in operation at the first speed) as the driver selects the L range, the C2 solenoid pressure Ps1c2 from the C2 linear solenoid valve SLC2 corresponding to the clutch C2 which is normally not engaged at the same time as the brake B3 is supplied to the brake B3 which is engaged at the same time as the clutch C1. Therefore, as shown in FIG. 5, in order to enable the C2 solenoid pressure Ps1c2 from the C2 linear solenoid valve SLC2 to be selectively supplied to the clutch C2 and the brake B3, the hydraulic control device 50 according to the embodiment includes a C2/B3 switching valve 60, a B3 switching valve 70, and a normally closed solenoid valve S1 that is controlled by the speed change ECU 21 and that regulates the modulator pressure Pmod from the modulator valve 52 to output a solenoid pressure Ps1 serving as a signal pressure for the C2/B3 switching valve 60. The B3 switching valve 70 according to the embodiment is configured to have a fail-safe function for suppressing simultaneous engagement of the brake B1, which is normally not engaged at the same time as the brake B3, and the brake B3, and to supply the line pressure PL (Pr) from the manual valve 53 to the brake B3 which is engaged at the same time as the clutch C3 when the reverse range is selected.

Figure 6:
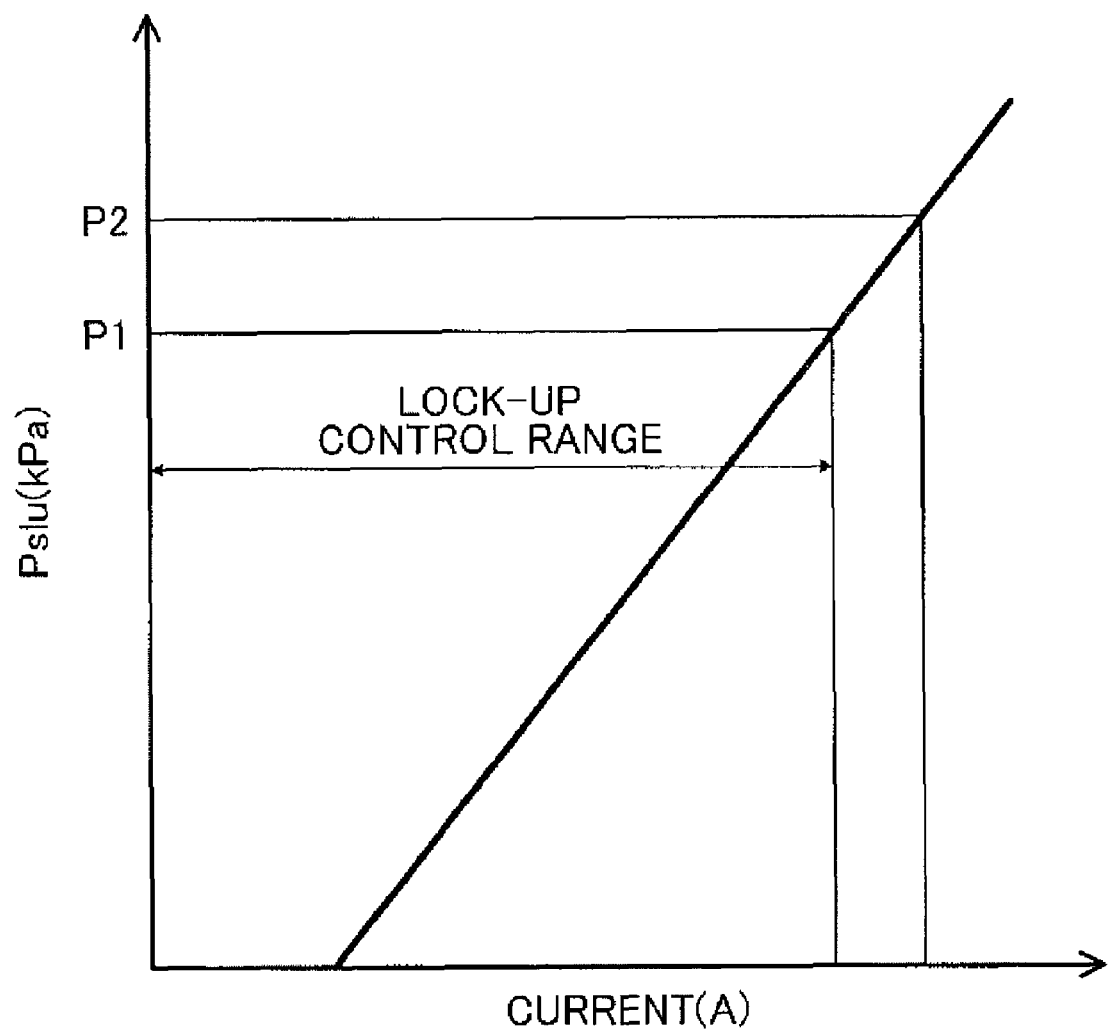
FIG. 6 illustrates the relationship between a current applied to a lock-up solenoid valve SLU and a lock-up solenoid pressure Pslu.

The lock-up solenoid valve SLU regulates the modulator pressure Pmod from the modulator valve 52 in accordance with the value of a current applied from the auxiliary battery (not shown) to generate the lock-up solenoid pressure Pslu, and is controlled by the speed change ECU 21. FIG. 6 shows the relationship between a current applied to the lock-up solenoid valve SLU and the lock-up solenoid pressure Pslu. The lock-up control valve 55 is a spool valve that regulates a secondary pressure Psec from a secondary regulator valve (not shown), which regulates the pressure of hydraulic oil drained from the primary regulator valve 51 so as to be lower than the line pressure PL in accordance with the maximum pressure Pmax, in accordance with the lock-up solenoid pressure Pslu supplied from the lock-up solenoid valve SLU to generate the lock-up pressure Plup for the lock-up clutch 28. The lock-up control valve 55 according to the embodiment generates the lock-up pressure Plup by reducing the secondary pressure Psec which is the source pressure to a greater degree as the lock-up solenoid pressure Pslu from the lock-up solenoid valve SLU is higher, and outputs the lock-up pressure Plup required for complete engagement of the lock-up clutch 28 when the lock-up solenoid pressure Pslu reaches a lock-up clutch complete engagement pressure P1 (see FIG. 6) that is equal to or less than the modulator pressure Pmod.

The lock-up relay valve 56 includes a spool urged by a spring, and receives as a signal pressure the lock-up solenoid pressure Pslu from the lock-up solenoid valve SLU. The lock-up relay valve 56 according to the embodiment is configured to establish the lock-up pressure block state when the lock-up solenoid pressure Pslu is not supplied to allow only supply of the secondary pressure (circulation pressure) Psec from the secondary regulator valve to the lock-up chamber 23b discussed above, and to establish the lock-up pressure supply state when the lock-up solenoid pressure Pslu is supplied to allow supply of the secondary pressure Psec to the fluid transmission chamber 23a and supply of the lock-up pressure Plup to the lock-up chamber 23b. In addition, the lock-up relay valve 56 according to the embodiment is supplied with the solenoid pressure Ps1 from the solenoid valve S1 discussed above. When the solenoid pressure Ps1 from the solenoid valve S1 is input, the lock-up relay valve 56 establishes the lock-up pressure block state to block (prohibit) supply of the lock-up pressure Plup to the lock-up chamber 23b, that is, lock-up.

Next, the C2/B3 switching valve 60 and the B3 switching valve 70 discussed above will be described in detail.

As shown in FIG. 5, the C2/B3 switching valve 60 includes a spool 601 disposed in a valve body so as to be axially movable, a spring 602 that urges the spool 601, an input port 61 that communicates with an output port of the C2 linear solenoid valve SLC2 via an oil passage, a C2 drain port 62 capable of discharging a hydraulic pressure from the clutch C2, a B3 drain port 63 capable of discharging a hydraulic pressure from the brake B3, a signal pressure input port 64 that communicates with the drive range output port of the manual valve 53 via an oil passage, a line pressure input port 65 that communicates with the drive range output port of the manual valve 53 via an oil passage, a modulator pressure input port 66 that communicates with an output port of the modulator valve 52 via an oil passage, a first output port 67 that communicates with a hydraulic pressure entrance of the clutch C2 via an oil passage, a second output port 68 capable of supplying the C2 solenoid pressure Ps1c2 from the C2 linear solenoid valve SLC2 to the brake B3, and a third output port 69. Further, a spring chamber 603 houses the spring 602 of the C2/B3 switching valve 60, and communicates with an output port of the solenoid valve S1 via a port and an oil passage (not shown).

In the embodiment, the state of attachment of the C2/B3 switching valve 60 is a B3 supply state (second state) in which the C2 solenoid pressure Ps1c2 from the C2 linear solenoid valve SLC2 can be supplied to the brake B3 and a hydraulic pressure can be discharged from the clutch C2. That is, in the state of attachment of the C2/B3 switching valve 60 (B3 supply state), the spool 601 is urged by the spring 602 to be maintained in the state indicated by the dotted line in FIG. 5. This allows communication between the input port 61, which communicates with the output port of the C2 linear solenoid valve SLC2, and the second output port 68, allows communication between the first output port 67, which communicates with the hydraulic pressure entrance of the clutch C2, and the C2 drain port 62, and allows communication between the modulator pressure input port 66 and the third output port 69.

In addition, as discussed above, the signal pressure input port 64 of the C2/B3 switching valve 60 communicates with the drive range output port of the manual valve 53. When the line pressure PL is output from the primary regulator valve 51 with the forward travel shift range (drive range, 2nd-speed range, and L range) selected and with the oil pump 29 driven by power from the engine 12, the drive range pressure Pd from the manual valve 53, that is, the line pressure PL, is supplied to the signal pressure input port 64. Further, when the brake B3 is engaged (with engine brake in operation at the first speed) by supplying the C2 solenoid pressure Ps1c2 from the C2 linear solenoid valve SLC2 to the brake B3 in order to transfer friction torque from the turbine runner 25 side to the output shaft 37 with the first speed established in the automatic transmission 30 as the L range is selected, the solenoid valve S1 discussed above is controlled by the speed change ECU 21 so as to output the solenoid pressure Ps1 serving as a signal pressure, and the solenoid pressure Ps1 from the solenoid valve S1 is supplied to the spring chamber 603 of the C2/B3 switching valve 60.

The spring constant of the spring 602 of the C2/B3 switching valve 60, the area of the pressure receiving surface of the spool 601 facing the signal pressure input port 64, and the area of the pressure receiving surface of the spool 601 which receives the urging force of the spring 602 and the solenoid pressure Ps1 from the solenoid valve S1 are determined such that the spool 601 is brought into the state indicated by the solid line in FIG. 5 with the thrust applied to the spool 601 by the effect of the line pressure PL from the signal pressure input port 64 exceeding the urging force of the spring 602 when the line pressure PL is supplied to the signal pressure input port 64 and the solenoid pressure Ps1 from the solenoid valve S1 is not supplied to the spring chamber 603, and such that the spool 601 is brought into the state indicated by the dotted line in FIG. 5 (B3 supply state) with the sum of the urging force of the spring 602 and the thrust applied to the spool 601 by the effect of the solenoid pressure Ps1 exceeding the thrust applied to the spool 601 by the effect of the line pressure PL when the solenoid pressure Ps1 is supplied to the spring chamber 603 with the line pressure PL supplied to the signal pressure input port 64.

Consequently, when the line pressure PL is supplied to the signal pressure input port 64 and the solenoid pressure Ps1 from the solenoid valve S1 is not supplied to the spring chamber 603, the spool 601 is moved against the urging force of the spring 602, and the C2/B3 switching valve 60 establishes a C2 supply state (first state) in which the C2 solenoid pressure Ps1$c$2 from the C2 linear solenoid valve SLC2 can be supplied to the clutch C3 and in which a hydraulic pressure can be discharged from the brake B3 (see the solid line in FIG. 5). In the C2 supply state, the input port 61, which communicates with the output port of the C2 linear solenoid valve SLC2, and the first output port 67, which communicates with the hydraulic pressure entrance of the clutch C2, are communicated with each other, the B3 drain port 63, which can discharge a hydraulic pressure from the brake B3, and the second output port 68, which can supply the C2 solenoid pressure Ps1$c$2 to the brake B3, are communicated with each other, and the line pressure input port 65 and the third output port 69 are communicated with each other.

As shown in FIG. 5, the B3 switching valve 70 includes a plunger 700 disposed in a valve body so as to be axially movable, a spool 701 disposed in the valve body coaxially with the plunger 700 so as to be movable, a spring 702 that urges the spool 701, an input port 71 that communicates with the second output port 68 of the C2/B3 switching valve 60 via an oil passage, an output port 72 that communicates with a hydraulic pressure entrance of the brake B3 via an oil passage, a drain port 73 capable of discharging a hydraulic pressure from the brake B3, and a signal pressure input port 74 that communicates with the third output port 69 of the C2/B3 switching valve 60 via an oil passage. In addition, a spring chamber 703 houses the spring 702 of the B3 switching valve 70, and communicates with an output port of the lock-up solenoid valve SLU via a port and an oil passage (not shown).

In the embodiment, further, in order to provide the B3 switching valve 70 with the fail-safe function for suppressing simultaneous engagement of the brake B1 and the brake B3 discussed above, the plunger 700 and the spool 701 are configured to define an oil chamber 704. The oil chamber 704 is communicated with an output port of the B1 linear solenoid valve SLB1 which outputs (regulates) the B1 solenoid pressure Ps1$b$1 which is a hydraulic pressure to be supplied to the brake B1 which is normally not engaged at the same time as the brake B3. The spool 701 includes a first pressure receiving surface 701$a$ that receives the B1 solenoid pressure Ps1$b$1 from the B1 linear solenoid valve SLB1, and a second pressure receiving surface 701$b$ formed on the opposite side from the first pressure receiving surface 701$a$ to receive the urging force of the spring 702. In addition, the plunger 700 includes a pressure receiving surface 700$a$ that faces the first pressure receiving surface 701$a$ of the spool 701 to receive the B1 solenoid pressure Ps1$b$1 from the B1 linear solenoid valve SLB1, and a signal pressure receiving surface 700$b$ formed on the opposite side from the pressure receiving surface 700$a$ to receive a signal pressure supplied to the signal pressure input port 74. In the embodiment, the first pressure receiving surface 701$a$ of the spool 701 and the pressure receiving surface 700$a$ of the plunger 700 have the same area as each other.

In the embodiment, the state of attachment of the B3 switching valve 70 is a communicated state in which the C2 solenoid pressure Ps1$c$2 from the C2 linear solenoid valve SLC2 can be supplied to the brake B3. That is, in the state of attachment of the B3 switching valve 70 (communicated state), the spool 701 and the plunger 700 are urged together by the spring 702 to be maintained in the state indicated by the dotted line in FIG. 5. This allows communication between the input port 71, which communicates with the second output port 68 of the C2/B3 switching valve 60, and the output port 72, which communicates with the hydraulic pressure entrance of the brake B3.

In addition, as discussed above, the signal pressure input port 74 of the B3 switching valve 70 communicates with the third output port 69 of the C2/B3 switching valve 60. When the C2/B3 switching valve 60 establishes the C2 supply state in which the C2 solenoid pressure Ps1$c$2 from the C2 linear solenoid valve SLC2 can be supplied to the clutch C2, the drive range pressure Pd from the manual valve 53, that is, the line pressure PL, is supplied to the signal pressure input port 74. In addition, when the C2/B3 switching valve 60 establishes the B3 supply state in which the C2 solenoid pressure Ps1$c$2 from the C2 linear solenoid valve SLC2 can be supplied to the brake B3, the modulator pressure Pmod from the modulator valve 52 is supplied to the signal pressure input port 74. In the embodiment, further, when the C2/B3 switching valve 60 is switched from the C2 supply state into the B3 supply state so that the C2 solenoid pressure Ps1$c$2 from the C2 linear solenoid valve SLC2 is supplied to the brake B3, the solenoid valve S1 is controlled by the speed change ECU 21 so as to output the solenoid pressure Ps1 serving as a signal pressure for the C2/B3 switching valve 60, and the lock-up solenoid valve SLU is controlled by the speed change ECU 21 so as to output the lock-up solenoid pressure Pslu at a value P2 (see FIG. 6) that is higher than the lock-up clutch complete engagement pressure P1 discussed above determined in advance. When the C2 solenoid pressure Ps1$c$2 from the linear solenoid valve SLC2 is supplied to the brake B3, the lock-up solenoid pressure Pslu from the lock-up solenoid valve SLU is supplied to the spring chamber 703 of the B3 switching valve 70.

The spring constant of the spring 702 of the B3 switching valve 70, the area of the signal pressure receiving surface 700$b$ of the plunger 700 facing the signal pressure input port 74, and the area of the second pressure receiving surface 701$b$ of the spool 701 which receives the urging force of the spring 702 and the lock-up solenoid pressure Pslu from the lock-up solenoid valve SLU are determined such that the plunger 700 and the spool 701 are brought together into the state indicated by the solid line in FIG. 5 (blocked/discharge state) with the thrust applied to the plunger 700 by the effect of the line pressure PL on the signal pressure receiving surface 700$b$ of the plunger 700 exceeding the sum of the urging force of the spring 702 applied to the spool 701 and the thrust applied to the spool 701 by the effect of the lock-up solenoid pressure Pslu on the second pressure receiving surface 701$b$ when the line pressure PL is supplied to the signal pressure input port 74 as a signal pressure and the lock-up solenoid pressure Pslu (a hydraulic pressure that is equal to or less than the lock-up clutch complete engagement pressure P1) from the lock-up solenoid valve SLU is supplied to the spring chamber 703 as the lock-up clutch 28 executes lock-up, and such that the spool 701 and the plunger 700 are brought together into the state indicated by the dotted line in FIG. 5 (communicated state) with the sum of the urging force of the spring 702 applied to the spool 701 and the thrust applied to the spool 701 by the effect of the lock-up solenoid pressure Pslu exceeding the thrust applied to the plunger 700 by the effect of the modulator pressure Pmod when the modulator pressure Pmod is supplied to the signal pressure input port 74 and the lock-up solenoid pressure Pslu (a hydraulic pressure that is higher than the lock-up clutch complete engagement pressure P1) from the lock-up solenoid valve SLU is supplied to the spring chamber 703.

In the embodiment, further, the spring constant of the spring 702 of the B3 switching valve 70, the area of the first pressure receiving surface 701$a$ of the spool 701 facing the oil chamber 704, and the area of the second pressure receiving surface 701$b$ of the spool 701 which receives the urging force of the spring 702 and the lock-up solenoid pressure Pslu from the lock-up solenoid valve SLU are determined such that the spool 701 is brought into the state indicated by the solid line in FIG. 5 (blocked/discharge state) with the thrust applied to the spool 701 by the effect of the B1 solenoid pressure Ps1$b$1 on the first pressure receiving surface 701$a$ exceeding the sum of the urging force of the spring 702 applied to the spool 701 and the thrust applied to the spool 701 by the effect of the lock-up solenoid pressure Pslu from the lock-up solenoid valve SLU when the B1 solenoid pressure Ps1$b$1 from the B1 linear solenoid valve SLB1 is supplied with the C2 solenoid pressure Ps1$c$2 from the C2 linear solenoid valve SLC2 supplied to the brake B3 to engage the brake B3.

Subsequently, operation of the hydraulic control device 50 at the time when the forward travel shift range is selected by the driver of the automobile 10 incorporating the power transfer device 20 will be described.

When the forward travel shift range such as the drive range is selected by the driver, the engine 12 is in operation, and the oil pump 29 is driven by power from the engine 12, which causes the primary regulator valve 51 to generate the line pressure PL and causes the modulator valve 52 to generate the modulator pressure Pmod which is constant. During forward travel other than when engine brake is in operation at the first speed with the hydraulic control device 50 operating normally, the drive range pressure Pd from the manual valve 53, that is, the line pressure PL, is supplied to the signal pressure input port 64 of the C2/B3 switching valve 60, and the solenoid pressure Ps1 from the solenoid valve S1 is not supplied to the spring chamber 603 of the C2/B3 switching valve 60.

Consequently, during forward travel other than when engine brake is in operation at the first speed, the spool 601 is moved against the urging force of the spring 602, and the C2/B3 switching valve 60 establishes the C2 supply state (first state) indicated by the solid line in FIG. 5. In the C2 supply state, as discussed above, the input port 61 of the C2/B3 switching valve 60 and the first output port 67, which communicates with the hydraulic pressure entrance of the clutch C2, are communicated with each other, the B3 drain port 63 and the second output port 68 are communicated with each other, and the line pressure input port 65 and the third output port 69 are communicated with each other. Thus, if the C2 linear solenoid valve SLC2 is caused to output the C2 solenoid pressure Ps1$c$2 when the C2/B3 switching valve 60 establishes the C2 supply state, the C2 solenoid pressure Ps1$c$2 can be supplied to the clutch C2 to engage the clutch C2, and a hydraulic pressure can be discharged from the brake B3 as well.

In addition, when the C2/B3 switching valve 60 establishes the C2 supply state (during forward travel other than when engine brake is in operation at the first speed), the line pressure PL is supplied as a signal pressure to the signal pressure input port 74 of the B3 switching valve 70 from the third output port 69 of the C2/B3 switching valve 60. When the line pressure PL is thus supplied to the signal pressure input port 74 of the B3 switching valve 70, the plunger 700 and the spool 701 are moved against the urging force of the spring 702, and the B3 switching valve 70 establishes the blocked/discharge state indicated by the solid line in FIG. 5. In the blocked/discharge state, the output port 72, which communicates with the hydraulic pressure entrance of the brake B3, is communicated with the drain port 73, and thus supply of the C2 solenoid pressure Ps1$c$2 from the C2 linear solenoid valve SLC2 to the brake B3 can be blocked, and a hydraulic pressure can be discharged from the brake B3.

Then, even if the B1 solenoid pressure Ps1$b$1 from the B1 linear solenoid valve SLB1 is supplied to the oil chamber 704 of the B3 switching valve 70 when the brake B1 is to be engaged with the C2/B3 switching valve 60 establishing the C2 supply state (with the brake B3 not engaged), that is, when the second speed or the fourth speed is to be established, or the lock-up solenoid pressure Pslu from the lock-up solenoid valve SLU (a hydraulic pressure equal to or less than the lock-up clutch complete engagement pressure P1) is supplied to the C2/B3 switching valve at the same time as the B1 solenoid pressure Ps1$b$1 from the B1 linear solenoid valve SLB1 as the lock-up clutch 28 executes lock-up, movement of the plunger 700 and the spool 701 can be restricted by the line pressure PL which is high to more reliably maintain the B3 switching valve 70 in the blocked/discharge state.

With the hydraulic control device 50 according to the embodiment, in addition, when the B1 solenoid pressure Ps1$b$1 from the B1 linear solenoid valve SLB1 is supplied to the oil chamber 704 as the brake B1 is to be engaged with the brake B3 not engaged, that is, with the line pressure PL, which is higher than the modulator pressure Pmod, supplied to the B3 switching valve 70 as a signal pressure, movement of the plunger 700 can be restricted by the line pressure PL acting on the signal pressure receiving surface 700$b$ of the plunger 700 to more reliably suppress variations in volume of the oil chamber 704 defined by the first pressure receiving surface 701$a$ of the spool 701 and the pressure receiving surface 700$a$ of the plunger 700 facing the first pressure receiving surface 701$a$. Thus, according to the hydraulic control device 50, it is possible to stably supply the B1 solenoid pressure Ps1$b$1 from the B1 linear solenoid valve SLB1 to the brake B1 when the brake B1 is to be engaged, thereby suppressing occurrence of a shock during engagement of the brake B1.

On the other hand, when the solenoid pressure Ps1 is supplied to the spring chamber 603 with the line pressure PL supplied to the signal pressure input port 64 in order to engage the brake B3 by supplying the C2 solenoid pressure Ps1$c$2 from the C2 linear solenoid valve SLC2 to the brake B3, that is, with engine brake in operation at the first speed, the C2/B3 switching valve 60 establishes the B3 supply state indicated by the dotted line in FIG. 5. Consequently, the input port 61, which communicates with the output port of the C2 linear solenoid valve SLC2, and the second output port 68 are communicated with each other, and the first output port 67, which communicates with the hydraulic pressure entrance of the clutch C2, and the C2 drain port 62 are communicated with each other. Thus, the C2 solenoid pressure Ps1$c$2 from the C2 linear solenoid valve SLC2 can be supplied to the brake B3, and a hydraulic pressure can be discharged from the clutch C2.

When the brake B3 is to be engaged, in addition, the solenoid pressure Ps1 from the solenoid valve S1 is supplied to the spring chamber 603 of the C2/B3 switching valve 60, and the C2/B3 switching valve 60 establishes the B3 supply state. Then, the modulator pressure Pmod, which is lower than the line pressure PL, is supplied from the third output port 69 of the C2/B3 switching valve 60 establishing the B3 supply state to the signal pressure input port 74 of the B3 switching valve 70, and the lock-up solenoid pressure Pslu from the lock-up solenoid valve SLU is supplied to the spring chamber 703 of the B3 switching valve 70. Consequently, the spool 701 and the plunger 700 are moved together with the sum of the urging force of the spring 702 applied to the spool 701 and the thrust applied to the spool 701 by the effect of the lock-up solenoid pressure Pslu exceeding the thrust applied to the plunger 700 by the modulator pressure Pmod, and thus the B3 switching valve 70 establishes the communicated state indicated by the dotted line in FIG. 5. In the communicated state, the output port 72, which communicates with the hydraulic pressure entrance of the brake B3, is communicated with the input port 71, which communicates with the second output port 68 of the C2/B3 switching valve 60, and thus the C2 solenoid pressure Ps1c2 from the C2 linear solenoid valve SLC2 can be supplied to the brake B3.

Further, when the B1 solenoid pressure Ps1b1 from the B1 linear solenoid valve SLB1 is supplied to the oil chamber 704 when some abnormality occurs with the brake B3 thus engaged, the thrust applied to the spool 701 by the effect of the B1 solenoid pressure Ps1b1 on the first pressure receiving surface 701a exceeds the sum of the urging force of the spring 702 applied to the spool 701 and the thrust applied to the spool 701 by the effect of the lock-up solenoid pressure Pslu, and thus the B3 switching valve 70 can be quickly switched from the communicated state into the blocked/discharge state with the spool 701 brought into the state indicated by the solid line in FIG. 5. Consequently, the output port 72, which communicates with the hydraulic pressure entrance of the brake B3, and the drain port 73 can be communicated with each other by the B1 solenoid pressure Ps1b1 from the B1 linear solenoid valve SLB1 to discharge a hydraulic pressure from the brake B3, thereby quickly disengaging the brake B3. Thus, according to the hydraulic control device 50, it is possible to favorably suppress simultaneous engagement of the brake B1 and the brake B3 by quickly disengaging the brake B3 even if the B1 solenoid pressure Ps1b1 from the B1 linear solenoid valve SLB1 is supplied to the oil chamber 704 because of some abnormality with the brake B3 engaged.

In the hydraulic control device 50 according to the embodiment, as has been described above, when the C2 solenoid pressure Ps1c2 from the C2 linear solenoid valve SLC2 is not supplied to the brake B3, which is normally not engaged at the same time as the brake B1, so as not to engage the brake B3, the B3 switching valve 70 is supplied with the line pressure PL as a signal pressure for establishing the blocked/discharge state. When the C2 solenoid pressure Ps1c2 from the C2 linear solenoid valve SLC2 is supplied to the brake B3 to engage the brake B3, on the contrary, the B3 switching valve 70 is supplied with the modulator pressure Pmod, which is lower than the line pressure PL, as a signal pressure for establishing the communicated state.

Consequently, even if a hydraulic pressure from the B1 linear solenoid valve SLB1 is supplied to the B3 switching valve 70 when the brake B1 is to be engaged with the brake B3 not engaged, the B3 switching valve 70 can be more reliably maintained in the blocked/discharge state by the line pressure PL, which is higher than the modulator pressure Pmod. Thus, according to the hydraulic control device 50, it is possible to suppress variations in hydraulic pressure to be supplied to the brake B1 by decreasing the amount of hydraulic oil that flows from the B1 linear solenoid valve SLB1 into the B3 switching valve 70B when the brake B1 is to be engaged with the brake B3 not engaged. In addition, supplying the modulator pressure Pmod, which is lower than the line pressure PL, to the B3 switching valve 70 as a signal pressure for establishing the communicated state when the brake B3 is engaged facilitates establishing the blocked/discharge state using the B1 solenoid pressure Ps1b1 from the B1 linear solenoid valve SLB1 when the B1 solenoid pressure Ps1b1 from the B1 linear solenoid valve SLB1 is supplied to the B3 switching valve 70 with the brake B3 engaged. Consequently, even if a hydraulic pressure from the B1 linear solenoid valve SLB1 were supplied to the switching valve when the brake B3 is engaged, the B3 switching valve 70 could be quickly switched from the communicated state into the blocked/discharge state using the B1 solenoid pressure Ps1b1 from the B1 linear solenoid valve SLB1, thereby favorably suppressing simultaneous engagement of the brake B1 and the brake B3 with the brake B3 engaged. As a result, with the hydraulic control device 50 according to the embodiment, it is possible to more adequately suppress simultaneous engagement of the brake B1 and the brake B3 which are normally not engaged at the same time as each other.

In addition, the hydraulic control device 50 according to the embodiment includes the C2/B3 switching valve 60 which can establish the first state, in which the C2 solenoid pressure Ps1c2 from the C2 linear solenoid valve SLC2 can be supplied to the clutch C2 which is not engaged at the same time as the brake B3 and a hydraulic pressure can be discharged from the brake B3, and the second state, in which the C2 solenoid pressure Ps1c2 from the C2 linear solenoid valve SLC2 can be supplied to the brake B3 and a hydraulic pressure can be discharged from the clutch C2. The C2/B3 switching valve 60 can receive the line pressure PL and the modulator pressure Pmod as a signal pressure, and supplies the line pressure PL to the B3 switching valve 70 as a signal pressure when the first state is established, and supplies the modulator pressure Pmod to the B3 switching valve 70 as a signal pressure when the second state is established. Use of the thus configured C2/B3 switching valve 60 makes it possible to selectively supply the C2 solenoid pressure Ps1c2 from the C2 linear solenoid valve SLC2 to the clutch C2 and the brake B3 which are not engaged at the same time as each other, and to switch the signal pressure for the B3 switching valve 70 between the line pressure PL and the modulator pressure Pmod in accordance with the state of supply of a hydraulic pressure to the brake B3.

In the embodiment described above, further, the line pressure PL, which is higher than the modulator pressure Pmod, is supplied to the B3 switching valve 70 as a signal pressure when the brake B3 is not engaged. Thus, the B3 switching valve 70 can be more reliably maintained in the blocked/discharge state using the line pressure PL which is higher even if the B1 solenoid pressure Ps1b1 from the B1 linear solenoid valve SLB1 is supplied to the B3 switching valve 70 when the brake B1 is to be engaged with the brake B3 not engaged. In the embodiment described above, the modulator pressure Pmod, which is lower than the line pressure PL, is supplied to the B3 switching valve 70 as a signal pressure when the brake B3 is engaged. Thus, the blocked/discharge state can be more reliably established using the B1 solenoid pressure Ps1b1 from the B1 linear solenoid valve SLB1 when the B1 solenoid pressure Ps1b1 from the B1 linear solenoid valve SLB1 is supplied to the B3 switching valve 70 with the brake B3 engaged.

In addition, the lock-up solenoid pressure Pslu from the lock-up solenoid valve SLU is not supplied to the B3 switching valve 70 according to the embodiment when the blocked/discharge state is established, and the lock-up solenoid pressure Pslu from the lock-up solenoid valve SLU, which is different from a hydraulic pressure supplied to the B1 linear solenoid valve SLB1 and the C2 linear solenoid valve SLC2, is supplied to the second pressure receiving surface 701b of the spool 701 when the communicated state is established. The B3 switching valve 70 establishes the blocked/discharge state with the thrust applied to the plunger 700 by the effect of the line pressure PL on the signal pressure receiving surface 700b exceeding the urging force of the spring 702 applied to the spool 701, and establishes the communicated state with the sum of the urging force of the spring 702 applied to the spool 701 and the thrust applied to the spool 701 by the effect of the lock-up solenoid pressure Pslu on the second pressure receiving surface 701b exceeding the thrust applied to the plunger 700 by the effect of the modulator pressure Pmod on the signal pressure receiving surface 700b. Further, when the B1 solenoid pressure Ps1b1 from the B1 linear solenoid valve SLB1 is supplied to the B3 switching valve 70 with the B3 switching valve 70 establishing the communicated state and with the brake B3 engaged, the blocked/discharge state is established with the thrust applied to the spool 701 by the effect of the B1 solenoid pressure Ps1b1 on the first pressure receiving surface 701a exceeding the sum of the urging force of the spring 702 applied to the spool 701 and the thrust applied to the spool 701 by the effect of the lock-up solenoid pressure Pslu on the second pressure receiving surface 701b.

Thus, using the modulator pressure Pmod, which is lower than the line pressure PL, as a signal pressure for bringing the B3 switching valve 70 into the communicated state as in the embodiment described above makes it possible to reduce the urging force (rigidity) of the spring 702 and the lock-up solenoid pressure Pslu to be supplied to the spring chamber 703 required to establish the communicated state. This makes it easier for the thrust applied to the plunger 700 by the effect of the line pressure PL on the signal pressure receiving surface 700b to exceed the urging force of the spring 702 applied to the spool 701 when the B3 switching valve 70 is brought into the blocked/discharge state, thereby more reliably maintaining the blocked/discharge state when the brake B3 is not engaged. In addition, using the modulator pressure Pmod, which is lower than the line pressure PL, as a signal pressure for bringing the B3 switching valve 70 into the communicated state to reduce the urging force (rigidity) of the spring 702 and the lock-up solenoid pressure Pslu to be supplied to the spring chamber 703 makes it easier for the thrust applied to the spool 701 by the effect of the B1 solenoid pressure Ps1b1 on the first pressure receiving surface 701a to exceed the sum of the urging force of the spring 702 applied to the spool 701 and the thrust applied to the spool 701 by the effect of the lock-up solenoid pressure Pslu on the second pressure receiving surface 701b when the B1 solenoid pressure Ps1b1 from the B1 linear solenoid valve SLB1 is supplied to the B3 switching valve 70 with the brake B3 engaged. As a result, with use of the B3 switching valve 70 discussed above, even if the B1 solenoid pressure Ps1b1 from the B1 linear solenoid valve SLB1 were supplied to the B3 switching valve 70 when the brake B3 is engaged, the B3 switching valve 70 could be quickly switched from the communicated state into the blocked/discharge state using the B1 solenoid pressure Ps1b1 from the B1 linear solenoid valve SLB1. It should be noted, however, that the lock-up solenoid pressure Pslu may not be supplied to the spring chamber 703 of the B3 switching valve 70 during engagement of the brake B3 by adjusting the spring constant of the spring 702 of the B3 switching valve 70.

In the embodiment described above, further, when the B1 solenoid pressure Ps1b1 from the B1 linear solenoid valve SLB1 is supplied to the B3 switching valve 70 as the brake B1 is to be engaged with the brake B3 not engaged, that is, with the line pressure PL, which is higher than the modulator pressure Pmod, supplied to the B3 switching valve 70 as a signal pressure, movement of the plunger 700 can be restricted by the line pressure PL acting on the signal pressure receiving surface 700b of the plunger 700 to more reliably suppress variations in volume of the oil chamber 704 defined by the first pressure receiving surface 701a of the spool 701 and the pressure receiving surface 700a of the plunger 700 facing the first pressure receiving surface 701a. Thus, according to the embodiment described above, it is possible to stably supply the B1 solenoid pressure Ps1b1 from the B1 linear solenoid valve SLB1 to the brake B1 when the brake B1 is to be engaged with the brake B3 not engaged, thereby suppressing occurrence of a shock during engagement of the brake B1.

In addition, the lock-up relay valve 56 included in the hydraulic control device 50 according to the embodiment can receive the solenoid pressure Ps1 from the solenoid valve S1 as a signal pressure, and establishes the lock-up pressure block state to prohibit lock-up by the lock-up clutch 28 when the solenoid pressure Ps1 from the solenoid valve S1 is input. Consequently, it is possible to prevent friction torque transferred from the turbine runner 25 side to the output shaft 37 from becoming unnecessarily large through engagement of the brake B3, and to smoothly engage the brake B3 using the lock-up solenoid valve SLU.

Figure 7:
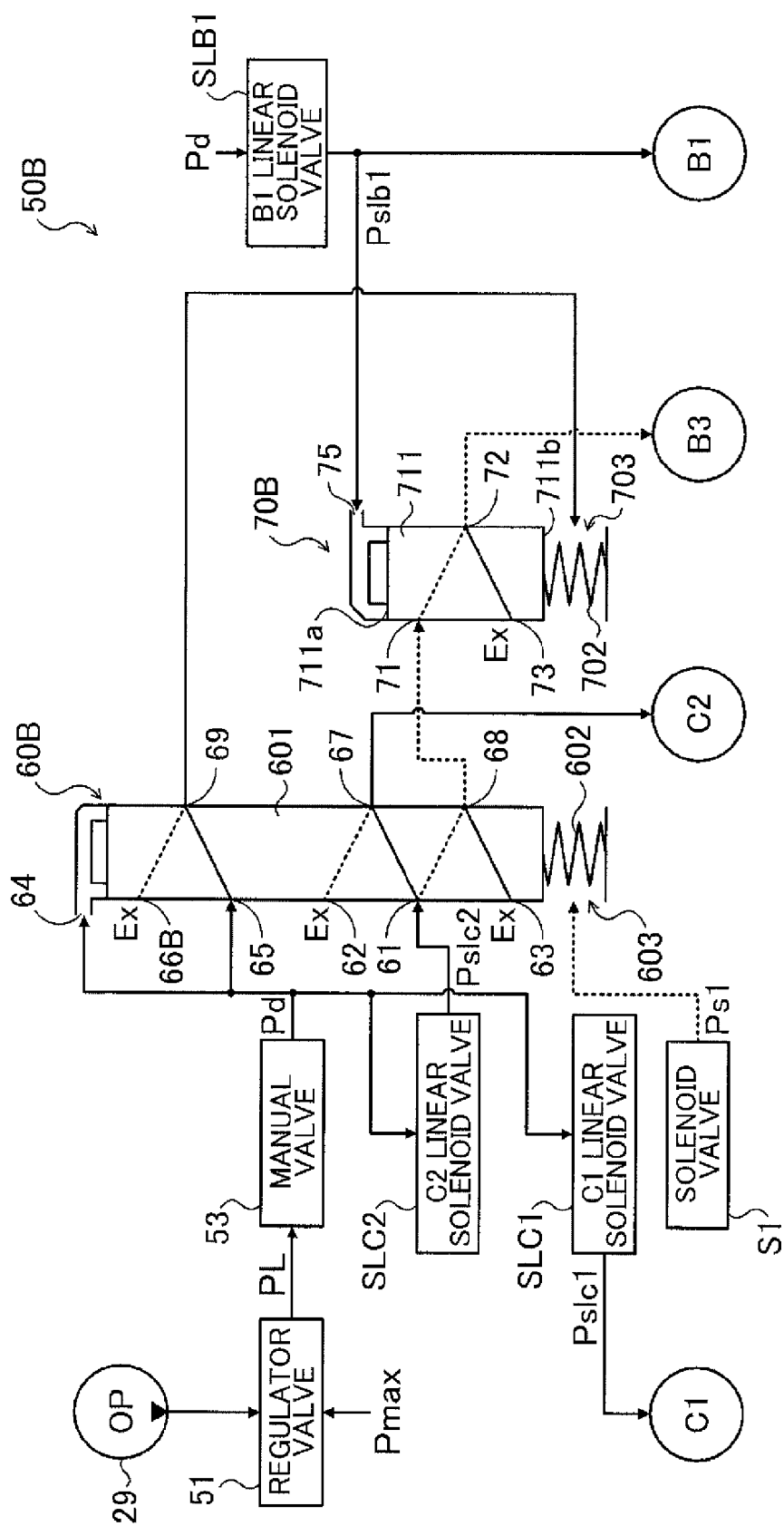
FIG. 7 is a system diagram showing a hydraulic control device 50B according to a modification.

FIG. 7 is a system diagram showing an essential portion of a hydraulic control device 50B according to a modification. In the following description, elements that are identical to the elements described in relation to the automobile 10, the power transfer device 20, the hydraulic control device 50, and so forth discussed above are given the same reference numerals to omit redundant descriptions.

The hydraulic control device 50B shown in FIG. 7 includes, in place of the C2/B3 switching valve 60 and the B3 switching valve 70 discussed above, a C2/B3 switching valve 60B in which the modulator pressure input port 66 of the C2/B3 switching valve 60 has been replaced with a drain port 66B, and a B3 switching valve 70B formed as a cut-off valve. The B3 switching valve 70B includes a spool 711 disposed in a valve body so as to be axially movable, a spring 702 that urges the spool 711, an input port 71 that communicates with the second output port 68 of the C2/B3 switching valve 60B via an oil passage, an output port 72 that communicates with a hydraulic pressure entrance of the brake B3 via an oil passage, a drain port 73 capable of discharging a hydraulic pressure from the brake B3, and a B1 solenoid pressure input port 75 that communicates with the output port of the B1 linear solenoid valve SLB1 via an oil passage. In addition, the spool 711 includes a first pressure receiving surface 711a that receives the B1 solenoid pressure Ps1b1 from the B1 linear solenoid valve SLB1, and a second pressure receiving surface 711b formed on the opposite side from the first pressure receiving surface 711a to receive the urging force of the spring 702. Further, a spring chamber 703 houses the spring 702 of the B3 switching valve 70B, and communicates with the third output port 69 of the C2/B3 switching valve 60B via a port and an oil passage (not shown). Thus, the second pressure receiving surface 711b of the spool 711 receives not only the urging force of the spring 702 but also a hydraulic pressure from the third output port 69 of the C2/B3 switching valve 60B.

In such a modification, the state of attachment of the B3 switching valve 70B is a communicated state in which the C2 solenoid pressure Ps1c2 from the C2 linear solenoid valve SLC2 can be supplied to the brake B3. That is, in the state of attachment of the B3 switching valve 70B, the spool 711 is urged by the spring 702 to be maintained in the state indicated by the dotted line in the drawing. This allows communication between the input port 71, which communicates with the second output port 68 of the C2/B3 switching valve 6013, and the output port 72, which communicates with the hydraulic pressure entrance of the brake B3.

In addition, as discussed above, the spring chamber 703 of the B3 switching valve 70B communicates with the third output port 69 of the C2/B3 switching valve 60B. When the C2/B3 switching valve 60B establishes the C2 supply state in which the C2 solenoid pressure Ps1c2 from the C2 linear solenoid valve SLC2 can be supplied to the clutch C2, the drive range pressure Pd from the manual valve 53, that is, the line pressure PL, is supplied to the spring chamber 703 as a holding pressure for holding the communicated state. On the contrary, when the C2/B3 switching valve 60B establishes the B3 supply state in which the C2 solenoid pressure Ps1c2 from the C2 linear solenoid valve SLC2 can be supplied to the brake B3, the spring chamber 703 of the B3 switching valve 70B communicates with the drain port 66B via the third output port 69 of the C2/B3 switching valve 60B.

Further, the spring constant of the spring 702 of the B3 switching valve 70B and the area of the first pressure receiving surface 711a which receives the B1 solenoid pressure Ps1b1 from the B1 linear solenoid valve SLB1 are determined such that the spool 711 is brought into the state indicated by the solid line in FIG. 7 (blocked/discharge state) with the thrust applied to the spool 711 by the effect of the solenoid pressure Ps1b1 on the first pressure receiving surface 711a exceeding the urging force of the spring 702 applied to the spool 711 when the B1 solenoid pressure Ps1b1 from the B1 linear solenoid valve SLB1 is supplied with the C2 solenoid pressure Ps1c2 from the C2 linear solenoid valve SLC2 supplied to the brake B3 to engage the brake B3.

In the hydraulic control device 50B configured as discussed above, when the brake B3 is not engaged with the C2/B3 switching valve 60B establishing the C2 supply state, the line pressure PL serving as a holding pressure is supplied to the spring chamber 703 of the B3 switching valve 70B via the C2/B3 switching valve 60B, and the B3 switching valve 70B is maintained in the communicated state discussed above by the urging force of the spring 702 and the thrust applied to the spool 711 by the effect of the line pressure PL on the second pressure receiving surface 711b. It should be noted, however, that in this event, the C2 solenoid pressure Ps1c2 from the C2 linear solenoid valve SLC2 is not supplied to the input port 71 of the B3 switching valve 70B via the C2/B3 switching valve 60B, and thus the C2 solenoid pressure Ps1c2 from the linear solenoid valve SLC2 is not supplied to the brake B3 even if the B3 switching valve 70B is maintained in the communicated state.

Consequently, even if the B1 solenoid pressure Ps1b1 from the B1 linear solenoid valve SLB1 is supplied to the B3 switching valve 70B when the brake B1 is to be engaged with the brake B3 not engaged, not only the urging force of the spring but also the thrust due to the effect of the line pressure PL on the second pressure receiving surface 711b is applied to the spool 711, and thus the B3 switching valve 70B can be more reliably maintained in the blocked/discharge state.

Thus, also with the hydraulic control device 50B according to the modification, it is possible to suppress variations in hydraulic pressure to be supplied to the brake B1 by decreasing the amount of hydraulic oil that flows from the B1 linear solenoid valve SLB1 into the B3 switching valve 70B when the brake B1 is to be engaged with the brake B3 not engaged.

When the brake B3 is to be engaged with the C2/B3 switching valve 60B establishing the B3 supply state, on the contrary, the C2 solenoid pressure Ps1c2 from the linear solenoid valve SLC2 is supplied to the input port 71 of the B3 switching valve 70B via the C2/B3 switching valve 60B, and the line pressure PL serving as a holding pressure is not supplied to the spring chamber 703 of the B3 switching valve 70B via the C2/B3 switching valve 60B. Thus, in this event, the B3 switching valve 70B is maintained in the communicated state discussed above by only the urging force of the spring 702, and the C2 solenoid pressure Ps1c2 from the C2 linear solenoid valve SLC2 is supplied to the brake B3 via the B3 switching valve 70B in the communicated state.

In this way, not supplying the line pressure PL serving as a holding pressure to the B3 switching valve 70B when the brake B3 is to be engaged facilitates establishing the blocked/discharge state using the B1 solenoid pressure Ps1b1 from the B1 linear solenoid valve SLB1 when the B1 solenoid pressure Ps1b1 from the B1 linear solenoid valve SLB1 is supplied to the B3 switching valve 70B with the brake B3 engaged. That is, when the B1 solenoid pressure Ps1b1 is supplied to the B3 switching valve 70B with the brake B3 engaged, the blocked/discharge state is established with the thrust applied to the spool 711 by the effect of the B1 solenoid pressure Ps1b1 on the first pressure receiving surface 711a exceeding the urging force of the spring 702. Consequently, even if the B1 solenoid pressure Ps1b1 from the B1 linear solenoid valve SLB1 were supplied to the B3 switching valve 70B when the brake B3 is engaged, the B3 switching valve 70B could be quickly switched from the communicated state into the blocked/discharge state using the B1 solenoid pressure Ps1b1, thereby favorably suppressing simultaneous engagement of the brake B1 and the brake B3 with the brake B3 engaged. As a result, also with the hydraulic control device 50B according to the modification, it is possible to more adequately suppress simultaneous engagement of the brake B1 and the brake B3 which are normally not engaged at the same time as each other.

The B3 switching valve 70B has a relatively simple configuration, and thus adopting the B3 switching valve 70B can reduce the cost of the hydraulic control device 50B. Further, use of the C2/B3 switching valve 60B makes it possible to selectively supply the C2 solenoid pressure Ps1c2 from the C2 linear solenoid valve SLC2 to the clutch C2 and the brake B3 which are not engaged at the same time as each other, and to switch whether the line pressure PL serving as a holding pressure is supplied to or discharged from the B3 switching valve 70B in accordance with the state of supply of the C2 solenoid pressure Ps1c2 to the brake B3.

Here, the correspondence between the main elements of the embodiment and the main elements of the invention described in the "SUMMARY OF THE INVENTION" section will be described. In the embodiment described above, the hydraulic control device 50, 50B of the automatic transmission 30 capable of transferring power applied to the front cover 18 to the output shaft 37 at a speed change ratio that is changeable in a plurality of stages by engaging and disengaging the plurality of clutches C1 and C2 and the brake B1 etc. corresponds to the "hydraulic control device". The B1 linear solenoid valve SLB1 which regulates the B1 solenoid pressure Ps1b1 to be supplied to the brake B1 corresponds to the "first pressure regulation valve". The C2 linear solenoid valve SLC2 which regulates a hydraulic pressure to be supplied to the brake B3 which is normally not engaged at the same time as the brake B1 corresponds to the "second pressure regulation valve". The B3 switching valve 70 and the B3 switching valve 70B correspond to the "switching valve". The B3 switching valve 70 can establish the blocked/discharge state in which supply of the C2 solenoid pressure Ps1c2 from the C2 linear solenoid valve SLC2 to the brake B3 is blocked and a hydraulic pressure can be discharged from the brake B3 and the communicated state in which the C2 solenoid pressure Ps1c2 from the C2 linear solenoid valve SLC2 can be supplied to the brake B3, and can receive the line pressure PL and Pmod serving as signal pressures for establishing the blocked/discharge state and the communicated state and the B1 solenoid pressure Ps1b1 from the B1 linear solenoid valve SLB1. The B3 switching valve 70B can establish the blocked/discharge state in which supply of the C2 solenoid pressure Ps1c2 from the C2 linear solenoid valve SLC2 to the brake B3 is blocked and a hydraulic pressure can be discharged from the brake B3 and the communicated state in which the C2 solenoid pressure Ps1c2 from the C2 linear solenoid valve SLC2 can be supplied to the brake B3, and can receive the line pressure PL serving as a holding pressure for holding the communicated state and the B1 solenoid pressure Ps1b1 from the B1 linear solenoid valve SLB1. The C2/B3 switching valve 60 and the C2/B3 switching valve 60B correspond to the "second switching valve". The C2/B3 switching valve 60 can establish the first state in which the C2 solenoid pressure Ps1c2 from the C2 linear solenoid valve SLC2 can be supplied to the clutch C2 which is not engaged at the same time as the brake B3 and the second state in which the C2 solenoid pressure Ps1c2 from the C2 linear solenoid valve SLC2 can be supplied to the brake B3 and a hydraulic pressure can be discharged from the clutch C2. The C2/B3 switching valve 60B can establish the first state in which the C2 solenoid pressure Ps1c2 from the C2 linear solenoid valve SLC2 can be supplied to the clutch C2 which is not engaged at the same time as the brake B3 and the second state in which the C2 solenoid pressure Ps1c2 from the C2 linear solenoid valve SLC2 can be supplied to the brake B3 and a hydraulic pressure can be discharged from the clutch C2, and can receive the line pressure PL serving as a holding pressure. The solenoid valve S1 which can output the solenoid pressure Ps1 for switching the C2/B3 switching valve 60, 60B from the first state into the second state corresponds to the "signal pressure output valve".

The correspondence between the main elements of the embodiment etc. and the main elements of the invention described in the "SUMMARY OF THE INVENTION" section does not limit the elements of the invention described in the "SUMMARY OF THE INVENTION" section, because the embodiment etc. are examples given for the purpose of specifically describing the invention described in the "SUMMARY OF THE INVENTION" section. That is, the embodiment etc. are merely specific examples of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

The present invention can be utilized in the hydraulic control device manufacturing industry.

The invention claimed is:

1. A hydraulic control device for a speed change device capable of transferring power applied to an input member to an output member at a speed change ratio that is changeable in a plurality of stages by engaging and disengaging a plurality of hydraulic friction engagement elements, the hydraulic control device comprising:
   a first pressure regulation valve that regulates a hydraulic pressure to be supplied to a first hydraulic friction engagement element;
   a second pressure regulation valve that regulates a hydraulic pressure to be supplied to a second hydraulic friction engagement element that is normally not engaged at the same time as the first hydraulic friction engagement element; and
   a switching valve that can establish a blocked/discharge state, in which supply of the hydraulic pressure from the second pressure regulation valve to the second hydraulic friction engagement element is blocked and a hydraulic pressure can be discharged from the second hydraulic friction engagement element, and a communicated state, in which the hydraulic pressure from the second pressure regulation valve can be supplied to the second hydraulic friction engagement element, and that can receive a signal pressure for establishing the blocked/discharge state and the communicated state and the hydraulic pressure from the first pressure regulation valve, wherein
   the switching valve is supplied with a first signal pressure as the signal pressure when the blocked/discharge state is established and supplied with a second signal pressure, which is lower than the first signal pressure, as the signal pressure when the communicated state is established, and the switching valve establishes the blocked/discharge state when the hydraulic pressure from the first pressure regulation valve is input in the communicated state.

2. The hydraulic control device according to claim 1, further comprising:
   a second switching valve that can establish a first state, in which the hydraulic pressure from the second pressure regulation valve can be supplied to a third hydraulic friction engagement element that is not engaged at the same time as the second hydraulic friction engagement element, and a second state, in which the hydraulic pressure from the second pressure regulation valve can be supplied to the second hydraulic friction engagement element and a hydraulic pressure can be discharged from the third hydraulic friction engagement element, wherein
   the second switching valve can receive the first signal pressure and the second signal pressure, and supplies the first signal pressure to the switching valve as the signal pressure when the first state is established and supplies the second signal pressure to the switching valve as the signal pressure when the second state is established.

3. The hydraulic control device according to claim 2, wherein
   the first signal pressure is a line pressure, and the second signal pressure is a hydraulic pressure obtained by reducing the line pressure.

4. The hydraulic control device according to claim 2, wherein
   the switching valve includes a plunger disposed so as to be axially movable, a spool disposed coaxially with the plunger so as to be movable and capable of establishing the blocked/discharge state and the communicated state, and a spring that urges the spool against the plunger, and the spool includes a first pressure receiving surface that receives the hydraulic pressure from the first pressure regulation valve and a second pressure receiving surface formed on the opposite side from the first pressure receiving surface to receive an urging force of the spring, and the plunger includes a pressure receiving surface that faces the first pressure receiving surface of the spool to receive the hydraulic pressure from the first pressure regulation valve and a signal pressure receiving surface formed on the opposite side from the pressure receiving surface to receive the signal pressure.

5. The hydraulic control device according to claim 4, wherein the switching valve is supplied with a hydraulic pressure from an additional pressure regulation valve that is different from the first and second pressure regulation valves so that the hydraulic pressure from the additional pressure regulation valve acts on the second pressure receiving surface of the spool when the communicated state is established, and the switching valve is not supplied with the hydraulic pressure from the additional pressure regulation valve when the blocked/discharge state is established.

6. The hydraulic control device according to claim 5, further comprising:

a lock-up solenoid valve that generates a lock-up control pressure used to set a lock-up pressure to be supplied to a lock-up clutch, wherein the additional pressure regulation valve is the lock-up solenoid valve.

7. The hydraulic control device according to claim 6, further comprising:

a signal pressure output valve that can output a signal pressure for switching the second switching valve from the first state into the second state; and a lock-up relay valve that can establish a lock-up pressure supply state in which the lock-up pressure can be supplied to the lock-up clutch and a lock-up pressure block state in which supply of the lock-up pressure to the lock-up clutch is blocked, wherein the lock-up relay valve is configured to receive the signal pressure from the signal pressure output valve, and to establish the lock-up pressure block state when the signal pressure from the signal pressure output valve is input.

8. The hydraulic control device according to claim 3, wherein the switching valve includes a plunger disposed so as to be axially movable, a spool disposed coaxially with the plunger so as to be movable and capable of establishing the blocked/discharge state and the communicated state, and a spring that urges the spool against the plunger, and the spool includes a first pressure receiving surface that receives the hydraulic pressure from the first pressure regulation valve and a second pressure receiving surface formed on the opposite side from the first pressure receiving surface to receive an urging force of the spring, and the plunger includes a pressure receiving surface that faces the first pressure receiving surface of the spool to receive the hydraulic pressure from the first pressure regulation valve and a signal pressure receiving surface formed on the opposite side from the pressure receiving surface to receive the signal pressure.

9. The hydraulic control device according to claim 8, wherein the switching valve is supplied with a hydraulic pressure from an additional pressure regulation valve that is different from the first and second pressure regulation valves so that the hydraulic pressure from the additional pressure regulation valve acts on the second pressure receiving surface of the spool when the communicated state is established, and the switching valve is not supplied with the hydraulic pressure from the additional pressure regulation valve when the blocked/discharge state is established.

10. The hydraulic control device according to claim 9, further comprising:

a lock-up solenoid valve that generates a lock-up control pressure used to set a lock-up pressure to be supplied to a lock-up clutch, wherein the additional pressure regulation valve is the lock-up solenoid valve.

11. The hydraulic control device according to claim 10, further comprising:

a signal pressure output valve that can output a signal pressure for switching the second switching valve from the first state into the second state; and a lock-up relay valve that can establish a lock-up pressure supply state in which the lock-up pressure can be supplied to the lock-up clutch and a lock-up pressure block state in which supply of the lock-up pressure to the lock-up clutch is blocked, wherein the lock-up relay valve is configured to receive the signal pressure from the signal pressure output valve, and to establish the lock-up pressure block state when the signal pressure from the signal pressure output valve is input.

12. A hydraulic control device for a speed change device capable of transferring power applied to an input member to an output member at a speed change ratio that is changeable in a plurality of stages by engaging and disengaging a plurality of hydraulic friction engagement elements, the hydraulic control device comprising:

a first pressure regulation valve that regulates a hydraulic pressure to be supplied to a first hydraulic friction engagement element;

a second pressure regulation valve that regulates a hydraulic pressure to be supplied to a second hydraulic friction engagement element that is normally not engaged at the same time as the first hydraulic friction engagement element; and a switching valve that can establish a blocked/discharge state, in which supply of the hydraulic pressure from the second pressure regulation valve to the second hydraulic friction engagement element is blocked and a hydraulic pressure can be discharged from the second hydraulic friction engagement element, and a communicated state, in which the hydraulic pressure from the second pressure regulation valve can be supplied to the second hydraulic friction engagement element, and that can receive a holding pressure for holding the communicated state and the hydraulic pressure from the first pressure regulation valve, wherein the switching valve is supplied with the holding pressure and not supplied with the hydraulic pressure from the second hydraulic friction engagement element when the second hydraulic friction engagement element is not engaged, the switching valve is supplied with the hydraulic pressure from the second hydraulic friction engagement element and not supplied with the holding pressure when the second hydraulic friction engagement element is engaged, and the switching valve can establish the communicated state irrespective of presence or absence of the holding pressure and establishes the blocked/discharge state when the hydraulic pressure from the first pressure regulation valve is input with the holding pressure not supplied.

13. The hydraulic control device according to claim 12, wherein
the switching valve includes a spool disposed so as to be movable and capable of establishing the blocked/discharge state and the communicated state, and a spring that urges the spool, and
the spool includes a first pressure receiving surface that receives the hydraulic pressure from the first pressure regulation valve and a second pressure receiving surface formed on the opposite side from the first pressure receiving surface to receive the holding pressure and an urging force of the spring.

14. The hydraulic control device according to claim 13, further comprising:
a second switching valve that can establish a first state, in which the hydraulic pressure from the second pressure regulation valve can be supplied to a third hydraulic friction engagement element that is not engaged at the same time as the second hydraulic friction engagement element, and a second state, in which the hydraulic pressure from the second pressure regulation valve can be supplied to the second hydraulic friction engagement element and a hydraulic pressure can be discharged from the third hydraulic friction engagement element, and that can receive the holding pressure, wherein
the second switching valve supplies the holding pressure to the switching valve when the first state is established, and blocks supply of the holding pressure to the switching valve and can discharge a hydraulic pressure from a spring chamber in which the spring of the switching valve is disposed when the second state is established.

* * * * *